United States Patent [19]
Miyoshi et al.

[11] Patent Number: 6,091,696
[45] Date of Patent: Jul. 18, 2000

[54] DISC CHANGER

[75] Inventors: Seizo Miyoshi, Neyagawa; Masahiko Nakamura, Osaka; Takeshi Ota, Yao; Katsuhiko Koshino, Neyagawa, all of Japan

[73] Assignee: Matsushita Electric Industrial Co., Ltd., Japan

[21] Appl. No.: 09/091,281

[22] PCT Filed: Nov. 17, 1997

[86] PCT No.: PCT/JP97/04184

§ 371 Date: Jun. 16, 1998

§ 102(e) Date: Jun. 16, 1998

[87] PCT Pub. No.: WO98/22945

PCT Pub. Date: May 28, 1998

[30] Foreign Application Priority Data

Nov. 19, 1996 [JP] Japan ................................. 8-307554

[51] Int. Cl.[7] .................................................. G11B 17/10
[52] U.S. Cl. .......................................... 369/192; 369/179
[58] Field of Search .................................... 369/192, 191, 369/193, 194, 34, 36, 178, 179

[56] References Cited

U.S. PATENT DOCUMENTS

| | | | |
|---|---|---|---|
| 1,302,217 | 4/1919 | Raney | 369/191 |
| 1,321,852 | 11/1919 | Rorison | 369/193 |
| 1,595,241 | 8/1926 | Nelson | 369/192 |
| 2,125,706 | 8/1938 | Wupper et al. | 369/192 |
| 2,159,833 | 5/1939 | Smyth, Jr. | 369/192 |
| 5,822,296 | 10/1998 | Nakamichi | 369/192 |

*Primary Examiner*—David L. Ometz
*Assistant Examiner*—Angel Castro
*Attorney, Agent, or Firm*—Parkhurst & Wendel, L.L.P

[57] ABSTRACT

It is an object of this invention to provide an inexpensive and high-quality disc changer by inserting a plurality of spacers and discs around a pair of spindles without the need for a stocker and subtrays. A vertical drive means drives a group of spacers (40) held by a disk holding means to select an arbitrary disc (12) from a group of discs (12), and a horizontal transfer means transfers it to a sound recording/reproduction position. An elevation return means prevents the disc (12) from slipping out from the spacer (40) on both spindles (19, 25). A disc presser means prevents the disc (12) from slipping out from the spacer (40). A spacer detachment prevention means prevents the spacer (40) from being detached from the lower spindle (19).

10 Claims, 27 Drawing Sheets

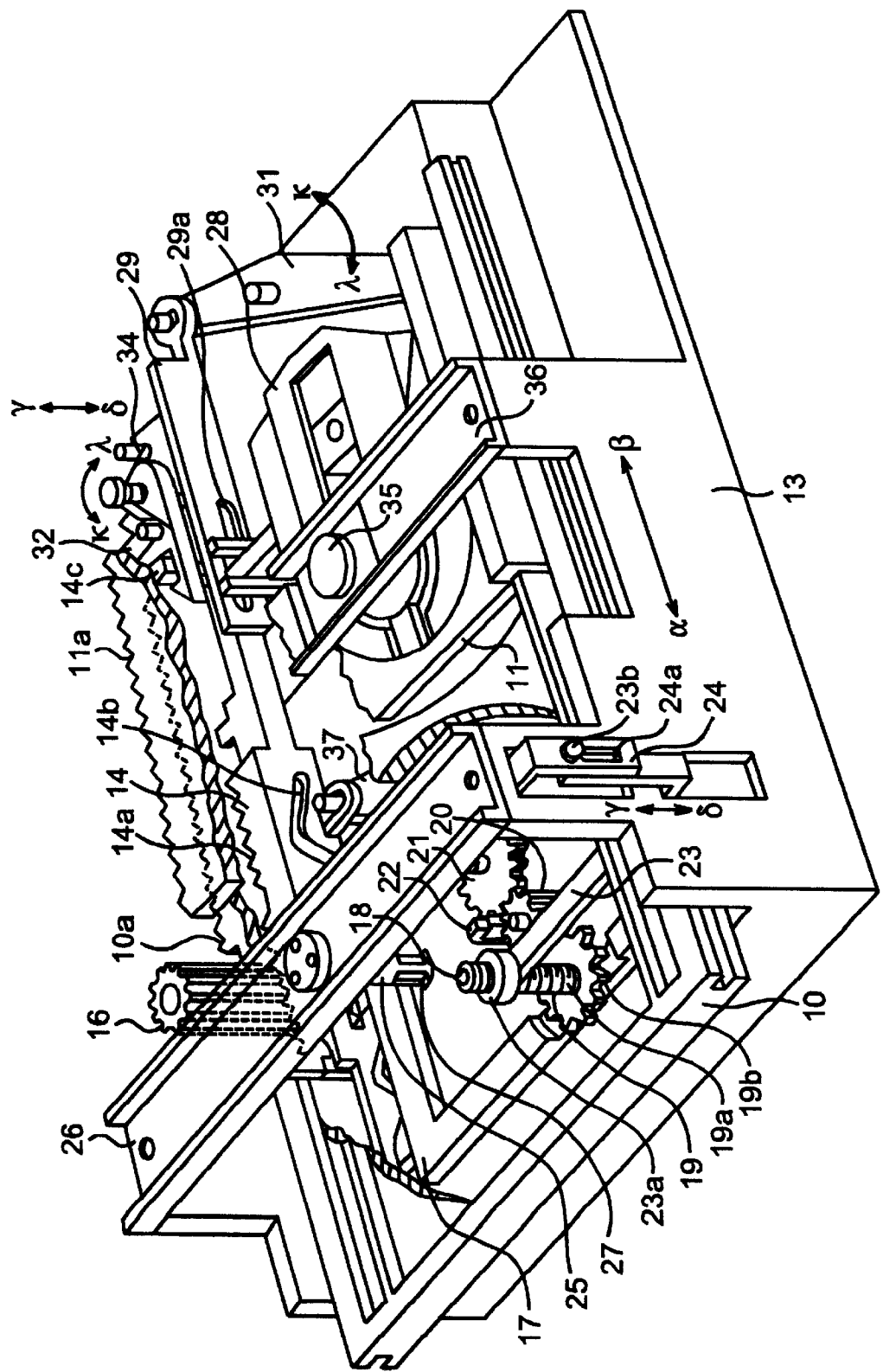

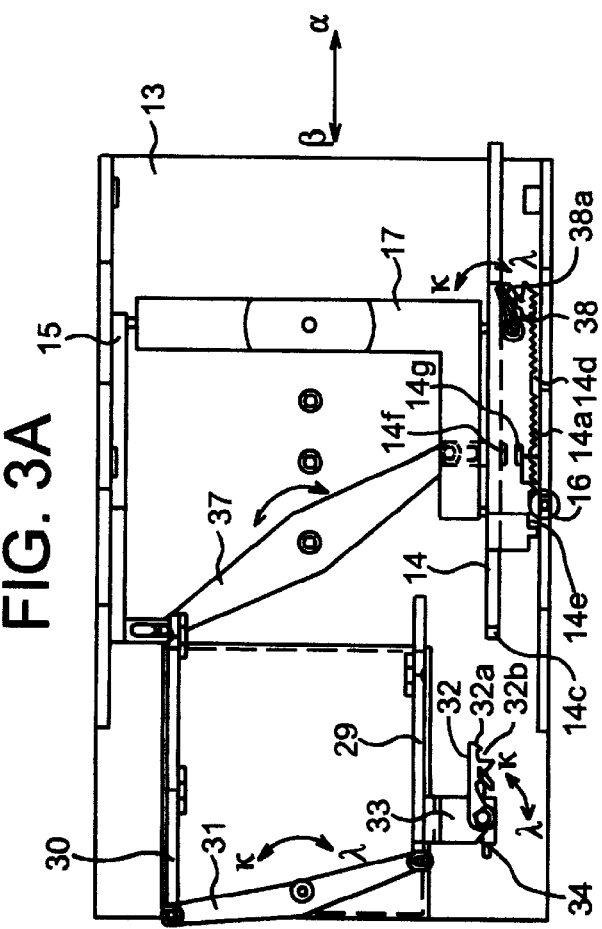
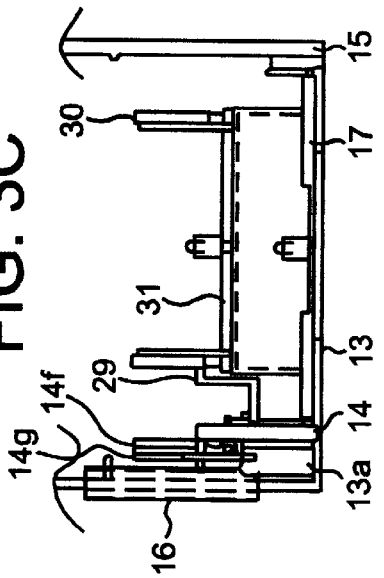
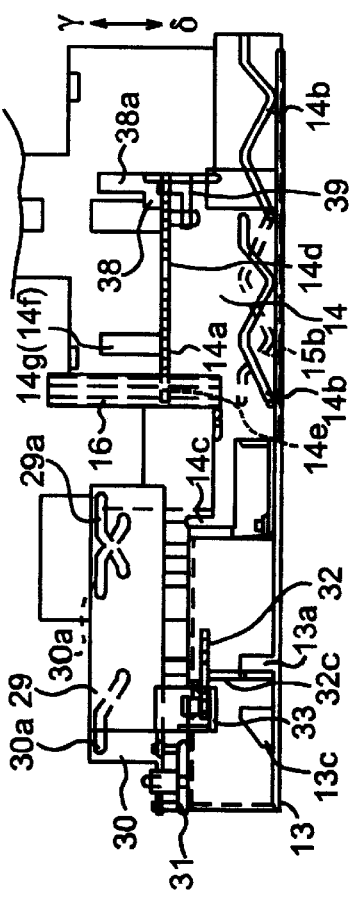

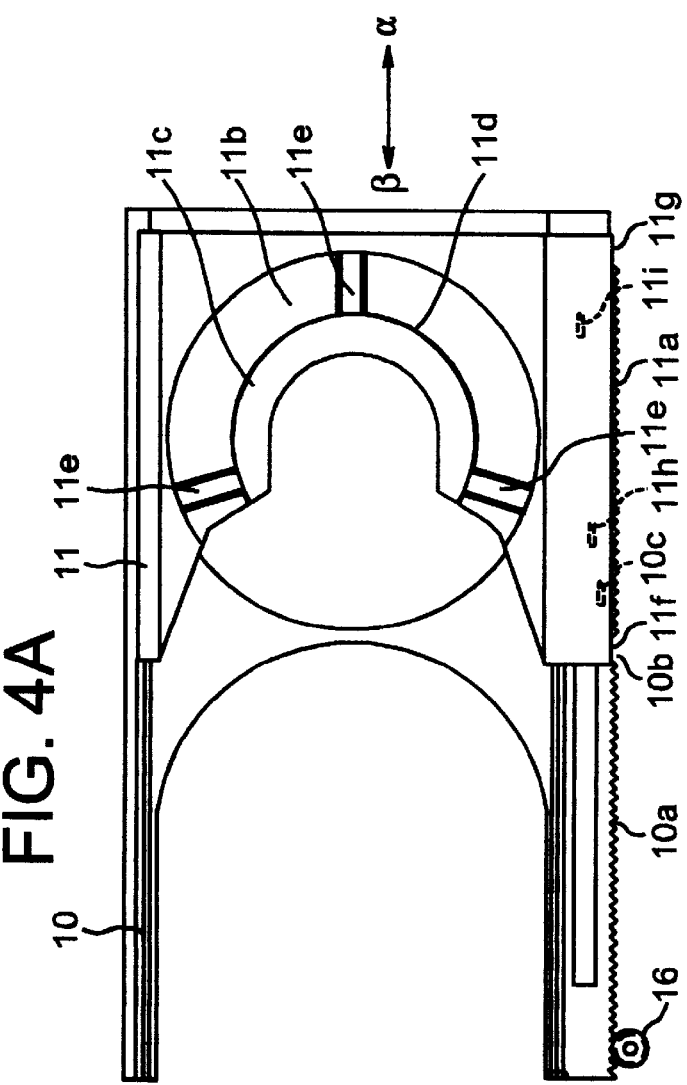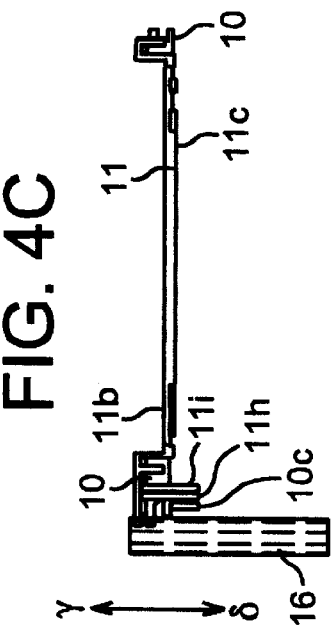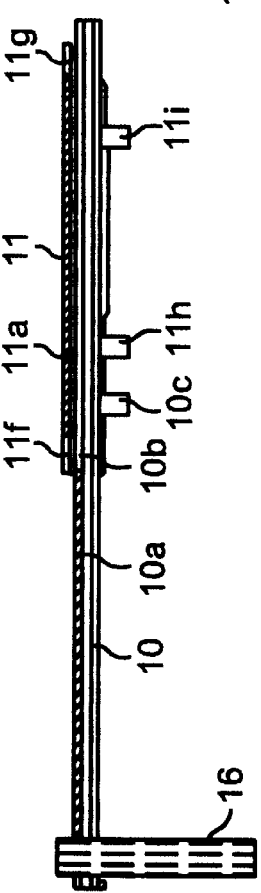

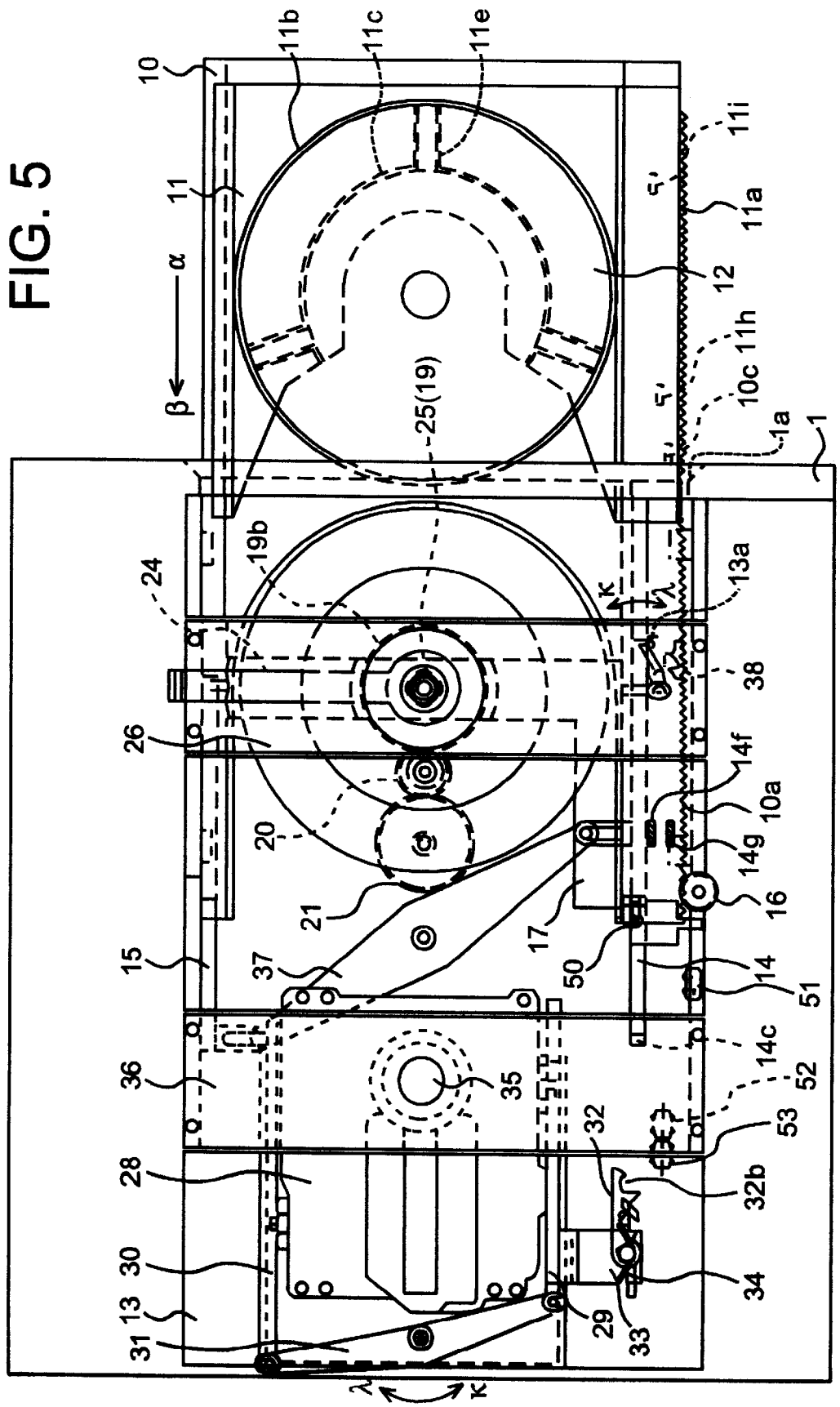

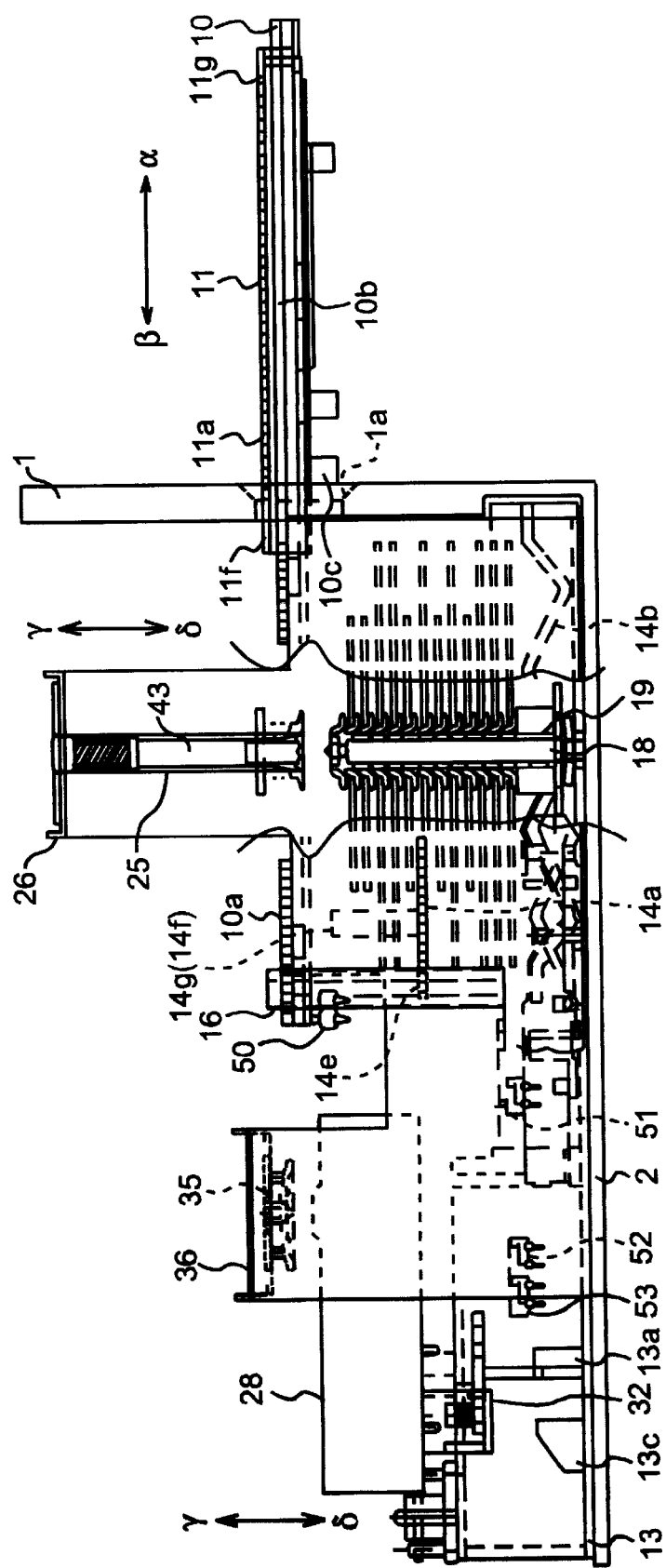

DISC CHANGER

FIELD OF THE INVENTION

The present invention relates to a disc changer in which a plurality of discs are loaded and which selects an arbitrary one of the plurality of discs for sound recording/reproduction.

BACKGROUND OF THE INVENTION

A disc changer of this kind uses a plurality of subtrays and a stocker, and the subtray is shaped to house both 8 and 12 cm CDc. To prevent discs from slipping out from the subtray, the pitch of shelves in the stocker on which the plurality of subtrays are housed is reduced to reduce the gap between the subtrays.

With the conventional disc slip-out prevention method for disc changers, however, discs housed in the stocker may slip out from subtrays due to the warpage or distortion of the subtrays.

It is an object of this invention to provide an inexpensive and high-quality disc changer by inserting a plurality of spacers and discs around a pair of spindles without the need for a stocker and a plurality of subtrays.

DISCLOSURE OF THE INVENTION

To achieve this object, the invention set forth in claim 1 is a disc changer in which a plurality of discs are loaded and which selects any one of the plurality of discs for sound recording/reproduction, characterized in that the disc changer comprises a disc holding means for detachably holding a plurality of spacers on a pair of spindles using a holding claw; a vertical drive means for driving the spacers in the vertical direction to select arbitrary positions for the plurality of discs held by the plurality of spacers; a spindle drive means for driving the holding claw to engage and disengage the plurality of spacers with and from an upper spindle; a horizontal transfer means for transferring the disc supported on a subtray; a disc clamp means for clamping the disc at a sound recording/reproduction position; and a disc presser means for preventing the slip-out of the disc from the spacer occurring when the disc changer performs an operation on both spindles; and a spacer detachment prevention means for preventing the spacer from being detached from the lower spindle when the lower spindle is elevated or lowered.

According to this invention, the vertical drive means can drive the plurality of spacers supported by the disc holding means, in the vertical direction to select any one of the plurality of discs held by these spacers, the spindle drive means can then drive the holding claw from the disc, and the horizontal transfer means can then transfer the selected disc to the sound recording/reproduction position while supporting it with the subtray. The disc clamp means then clamps the transferred disc at the sound recording/reproduction position. In addition, the disc presser means can prevent the disc from slipping out from the spacer installed on both spindles and the spacer detachment prevention means can prevent the spacer from slipping out from the lower spindle.

The invention set forth in claim 2 is a disc changer according to claim 1 wherein the holding claw provided on the upper spindle of the disc holding means is manufactured by integrating a core section that is pressed upward by the lower spindle with a claw portion that holds the spacer on the upper spindle.

This means enables the spacer and disc to be held stably and reliably and allows the spacer to pass vertically along both spindles by housing the claw portion of the holding claw inside the upper spindle when the lower spindle is pressed upward.

The invention for a disc presser means set forth in claim 3 is a disc changer according to claim 1 wherein the means for pressing the disc has an upper elevating table that can be expanded and contracted for a specified amount above a lower elevating table formed in the vertical drive means, and a disc presser spring provided on the bottom surface of the upper elevating table presses the spacer and disc installed on both spindles.

This means can prevent the disc from slipping out from the spacer by pressing the disc. With this means, in addition, the disc can be held horizontally and even when the disc changer is tilted, the spacer can be moved downward smoothly.

The invention for a disc presser means set forth in claim 4 is a disc changer according to claim 1 wherein the disc presser means uses a disc presser spring disposed between a spindle mounting plate and a disc presser in order to press the spacer and disc installed on both spindles, thereby preventing the disc from slipping out from the spacer and holding the disc horizontally.

The invention for a spacer detachment prevention means set forth in claim 5 is a disc changer according to claim 1 wherein the spacer detachment prevention means includes a detachment prevention claw that can vertically slide for a specified amount, on a lower central shaft provided in the lower spindle in the spindle drive means, said detachment prevention claw being constantly pressed upward by a compression spring to protrude from the outer circumference of the lower spindle in order to prevent the spacer from slipping out from the lower spindle, and wherein when the lower central shaft is pressed upward, the upper end of the detachment prevention claw is pressed downward by the lower end of the upper spindle to cause a claw portion to be constantly retracted into the lower spindle, and thus housing the detachment prevention claw in the lower spindle allows the spacer to smoothly pass between the lower and upper spindles so that arbitrary positions can be selected for a plurality of discs held by a plurality of spacers using the vertical drive means.

The invention for a spacer detachment prevention means set forth in claim 6 is a disc changer according to claim 1 wherein the spacer detachment prevention means includes a detachment prevention claw that can vertically slide for a specified amount, inside the lower spindle in the spindle drive means, and the detachment prevention claw being constantly pressed upward by a compression spring to protrude from the outer circumference of the lower spindle in order to prevent the spacer from slipping out from the lower spindle, and wherein when the lower spindle is pressed upward, a downward-pressed piece in the detachment prevention claw is pressed downward by the lower end of the upper spindle to cause a claw portion to be retracted into the lower spindle, the housing of the detachment prevention claw in the lower spindle allowing the spacer to smoothly pass between the lower and upper spindles so that arbitrary positions can be selected for a plurality of discs held by a plurality of spacers using the vertical drive means.

The invention for a spacer detachment prevention means set forth in claim 7 is a disc changer according to claim 6 wherein the detachment prevention claw is elastic and wherein a plurality of claw portions the tip of which enters and exits the lower spindle and the downward-pressed piece that presses the claw portions downward are integrated together in the lower part of the detachment prevention claw.

The invention set forth in claim 8 is a disc changer according to claim 1 wherein the sound recording/reproduction position lies in the front of the mechanical bases whereas a disc housing position that is centered at the spindle lies in the rear of the mechanical base.

The invention set forth in claim 9 is the configuration of the basic configuration according to claim 1 with the following configuration added thereto. This invention is a disc changer further including a transfer switching means operative during the sound recording/reproduction of the disc for switching the presence of transfer of the disc to distinguish between the change of another disc and the removal and change of the disc being sound recorded or reproduced, a disc pitch reduction means for reducing the height of the spacers supported by both spindles and an elevation return means for positively preventing the disc from slipping out from the spacer on both spindles due to external vibration generated when the disc changer body is moved.

According to this invention, during the sound recording/reproduction of a disc, the transfer switching means can switch the presence of the transfer of the disc to distinguish between the change of another disc and the removal and change of the disc being sound recorded or reproduced, and the disc pitch reduction means can reduce the height of the spacers supported by both spindles. In addition, not only the disc presser means but also the elevation return means serves to reliably prevent the disc from slipping out from the spacer installed on both spindles.

The invention for an elevation return means set forth in claim 10 is a disc changer according to claim 9 wherein once the disc changer has finished performing an operation on both spindles, the elevation return means rotates the lower spindle to elevate the lower elevating table, moving the spacer and disc on the lower spindle onto the upper spindle so that they are sandwiched between the upper elevating table and the upper spindle.

This means can sandwich the spacer and the disc between the upper elevating table and the upper spindle to positively prevent disc from slipping out from the spacer on both spindles due to external vibration generated when the disc charger body is moved.

BRIEF DESCRIPTION OF THE DRAWINGS

FIG. 2 is a partly cut perspective view of the appearance of an input section (a mechanical section) of the disc changer according to the embodiment of this invention;

FIG. 3 shows a drive section of the disc changer according to the embodiment of this invention, wherein (A) is a partial cross sectional plan view, (B) a side view, and (C) a cross sectional front view;

FIG. 4 shows a subtray and a main tray of the disc changer according to the embodiment of this invention, wherein (A) is a plan view, (B) a side view, and (C) a cross sectional front view;

FIG. 5 is a partial cross sectional plan view showing the main tray of the disc changer according to the embodiment of this invention in which the main tray has been drawn out to change a disc;

FIG. 6 is a partial cross sectional side view showing the main tray of the disc changer according to the embodiment of this invention in which the main tray has been drawn out to change the disc;

DESCRIPTION OF THE EMBODIMENTS

A disc changer that exemplifies one embodiment of this invention is described below with reference to FIGS. 1 to 23.

Figure 1:
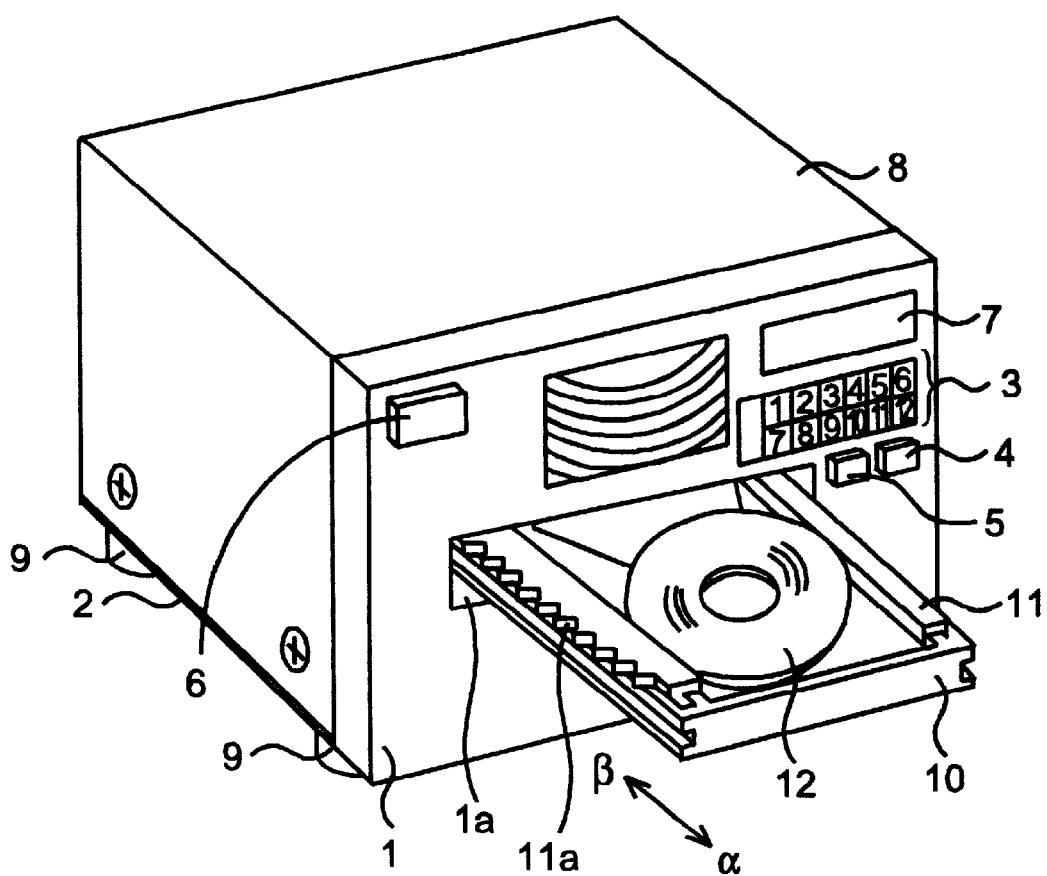
FIG. 1 is a perspective view of the appearance of a disc changer according to an embodiment of this invention.

In FIG. 1, reference numeral 1 designates a front panel mounted on a bottom plate 2, and a front surface includes No. keys 3, open close knob 4, start stop knob 5, a power button 6, and a display section 7. Reference numeral 8 denotes an outer case that covers a disc changer according to this invention, and 9 is an insulator provided on the bottom plate 2. Reference numeral 10 indicates a main tray that protrudes from an opening 1a in the front plane 1. Reference numeral 11 designates a subtray that can be guided by the main tray 10 to slide in arrow direction α–β and on which a changed disc 12 has been fed in this figure.

In FIGS. 2 and 3, reference numeral 13 denotes a mechanical base mounted on the bottom plate 2, and the main tray 10 has been guided to the mechanical base 13 so as to be moved in arrow direction α–β. Reference numerals 14 and 15 indicate elevating cams, which have been guided to the mechanical base 13 so as to be moved in arrow direction α–β, cam grooves 14b and 15b are formed in the elevating cams 14 and 15, respectively.

Reference numeral 16 is a horizontal drive gear journaled to the mechanical base 13 and rotated by a motor (not shown). The horizontal drive gear 16 engages a gear portion 10a of the main tray 10, a gear portion 11a of the subtray 11, and a gear portion 14a of the elevating cam 14 and is disposed so that its rotational driving force can drive the trays 10 and 11 and the cam 14 in arrow direction α–β.

The configuration of the spindle drive means is described below.

Reference numeral 17 designates a spindle base configured to be moved in the vertical direction by the cam grooves 14b, 15b, and a lower central shaft 18 is provided on the spindle base at its center.

A lower spindle 19 is journaled to the lower central shaft 18 as a vertical drive means. A threaded portion 19a is formed on the outer circumference of the lower central shaft, and a gear portion 19b is formed on the lower part thereof. The gear portion 19b engages a vertical drive gear 20 journaled to the mechanical base 13, and the vertical drive gear 20 engages an intermediate gear 21 that is rotated when driven by the motor (not shown) journaled to the mechanical base 13. Reference numeral 22 denotes a vertical feed detection switch that counts the number of rotations of the vertical drive gear 20.

Reference numeral 23 indicates a lower elevating table having a threaded portion 23a engaging the threaded portion 19a of the lower spindle 19 and configured to be vertically moved in arrow direction γ–δ when the lower spindle 19 is rotated. Reference numeral 24 denotes an upper elevating table having a vertical long hole 24a with which the shaft 23b of the lower elevating table 23 is engaged so that the table can slide in arrow direction γ–δ.

Reference numeral 25 indicates an upper spindle fixed to the center of a spindle mounting plate 26 provided above the mechanical base 13 so as be coaxial with the lower spindle 19. A holding claw 27 is provided on the upper spindle 25 as a disc holding means, and a claw portion of the holding claw 27 is driven by the lower central shaft 18 to enter and exit the outer circumference of the upper spindle 25.

The configuration of a disc clamp means is then described.

Reference numeral 28 designates a sound recording/reproduction device for the disc 12 that is driven to be elevated and lowered in direction α–β by cam portions 29a, 30a of a pair of stepped cams 29, 30 configured to be moved behind the mechanical base 13 in arrow direction γ–δ over a specified amount. Reference numeral 31 denotes a connecting plate rotatably journaled to the rear portion of the mechanical base 13 so as to be rotated in direction κ–λ, and one end of the connecting plate is engaged with the stepped cam 29 with the other end engaged with the stepped cam 30 so that the movement of the stepped cam 29 in direction α–β is transmitted to the stepped cam 30.

Reference numeral 32 denotes a hook journaled to a bracket 33 from the stepped cam 29 so as to be rotated for a specified amount. The hook 32 is configured to be rotationally returned in direction and pressed in direction δ by a spring 34 and to engage a protruding portion 14c formed in the rear portion of the elevating cam 14 in order to drive the stepped cam 29 in direction α–β. Reference numeral 35 is a disc damper for the sound recording/reproduction device 28 that is supported on a damper mounting plate 36 provided on the rear portion of the mechanical base 13 in such a way that there is a specified amount of gap between the device 28 and the damper 35.

In the spindle drive means, 37 is an elevating connecting plate rotatably journaled to the center of the mechanical base 13 so as to be rotated in direction κ–λ, and one end of the connecting plate is engaged with the elevating cam 14 with the other end engaged with the elevating cam 15 so that the movement of the elevating cam 14 in direction α–β is transmitted to the elevating cam 15.

The configuration of a disc pitch reduction means is then described.

Figure 16:
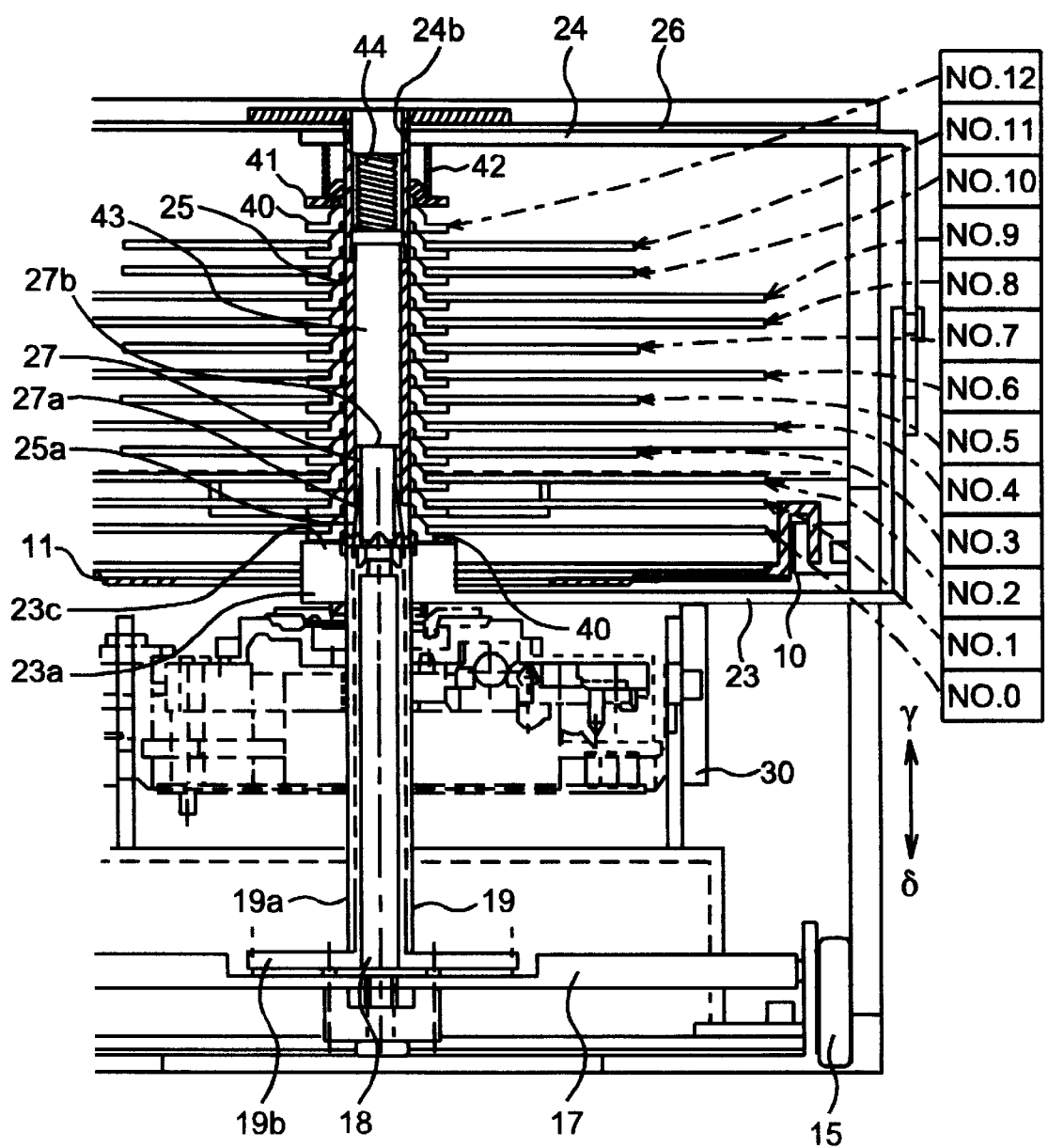
FIG. 16 is a cross sectional front view of the disc changer according to the embodiment of this invention in which a spacer returns to its origin to house the disc on a center spindle.

In FIGS. 4 and 16, to reduce the height of a spacer 40 and thus the thickness of the disc changer, a 12 cm disc loading section 11b of the subtray is formed at a somewhat higher position than an 8 cm disc loading section 11 c in arrow direction γ, with the sections 11b and 11c separated from each other by slits 11d, and a connection 11e can be flexed in direction γ–δ under a specified amount of force.

The configuration of the horizontal transfer means is described below.

In FIGS. 3 and 4, two non-gear portions 14d, 14e are formed on the gear portion 14a of the elevating so as to disengage the elevating cam 14 from the horizontal drive gear 16. One non-gear portion 10b is formed on the gear portion 10a of the main tray 10 cam 14 to disengage the main tray 10 from the horizontal drive gear 16. Furthermore, two non-gear portions 11f, 11g are formed on the gear portion 11a of the subtray 11 to disengage the subtray 11 from the horizontal drive gear 16.

Protruding portions 14f, 14g are formed on the rear portion of the elevating cam 14. In addition, an activating piece 38 is journaled to the front portion of the elevating cam so as to be rotated for a specified amount, and a pressed portion 38a formed on the activating piece 38 is constantly rotationally returned in direction λ by a spring 39 so as to be parallel with the protruding portions 14f, 14g.

One protruding portion 10c is formed on the bottom surface of the main tray 10. Two protruding portions 11h and 11i are formed on the bottom surface of the subtray 11.

Next, the stop positions of a horizontal transfer means consisting of the horizontal drive gear 16, elevating cam 14, main tray 10, and subtray 11, the configuration of the non-gear and protruding portions and the pressed portion 38a of the activating piece 38, and the height relationship between the spindle base 17 and the sound recording/reproduction device 28 are described with reference to FIGS. 5 through 11.

Figure 7:
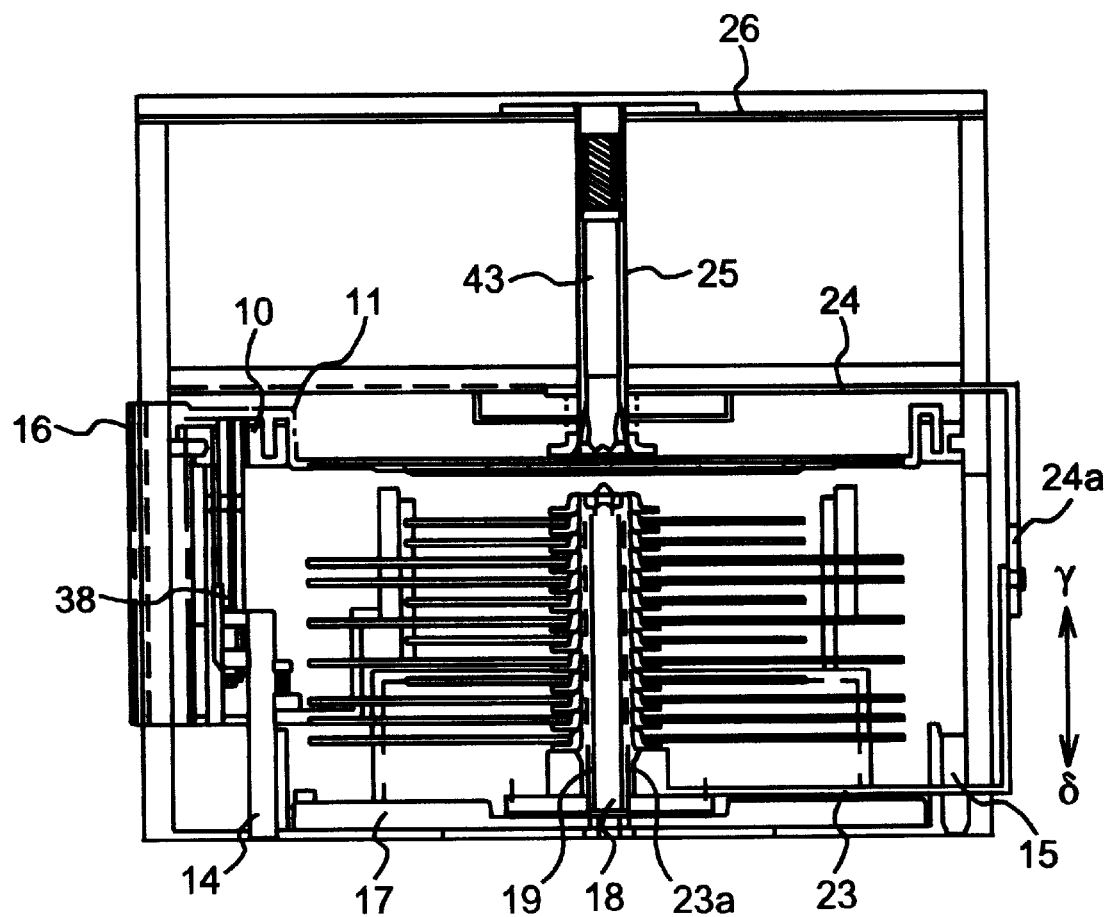
FIG. 7 is a cross sectional front view showing the main tray of the disc changer according to the embodiment of this invention in which the main tray has been drawn out to change the disc.

FIGS. 5 to 7 shows a state in which the main tray 10 and subtray 11 are driven out from the front panel 1 in arrow direction α by the horizontal drive gear 16, followed by the stoppage of a horizontal drive motor (not shown) by a switch 50.

In this case, the horizontal drive gear 16 engages the gear portion 10a of the main tray 10, the elevating cam 14 has been fed to the end in arrow direction α, and the non-gear portion 14e has disengaged the elevating cam 14 from the horizontal drive gear 16. Furthermore, the elevating cam 14 has lowered the spindle base 17 in arrow direction δ and the stepped cam 29 has lowered the sound recording/reproduction device 28 in arrow direction δ. In addition, the activating piece 38 is pressed by the protruding portion 13a of the mechanical base 13 to rotate against the spring 39 in arrow direction κ.

Figure 8:
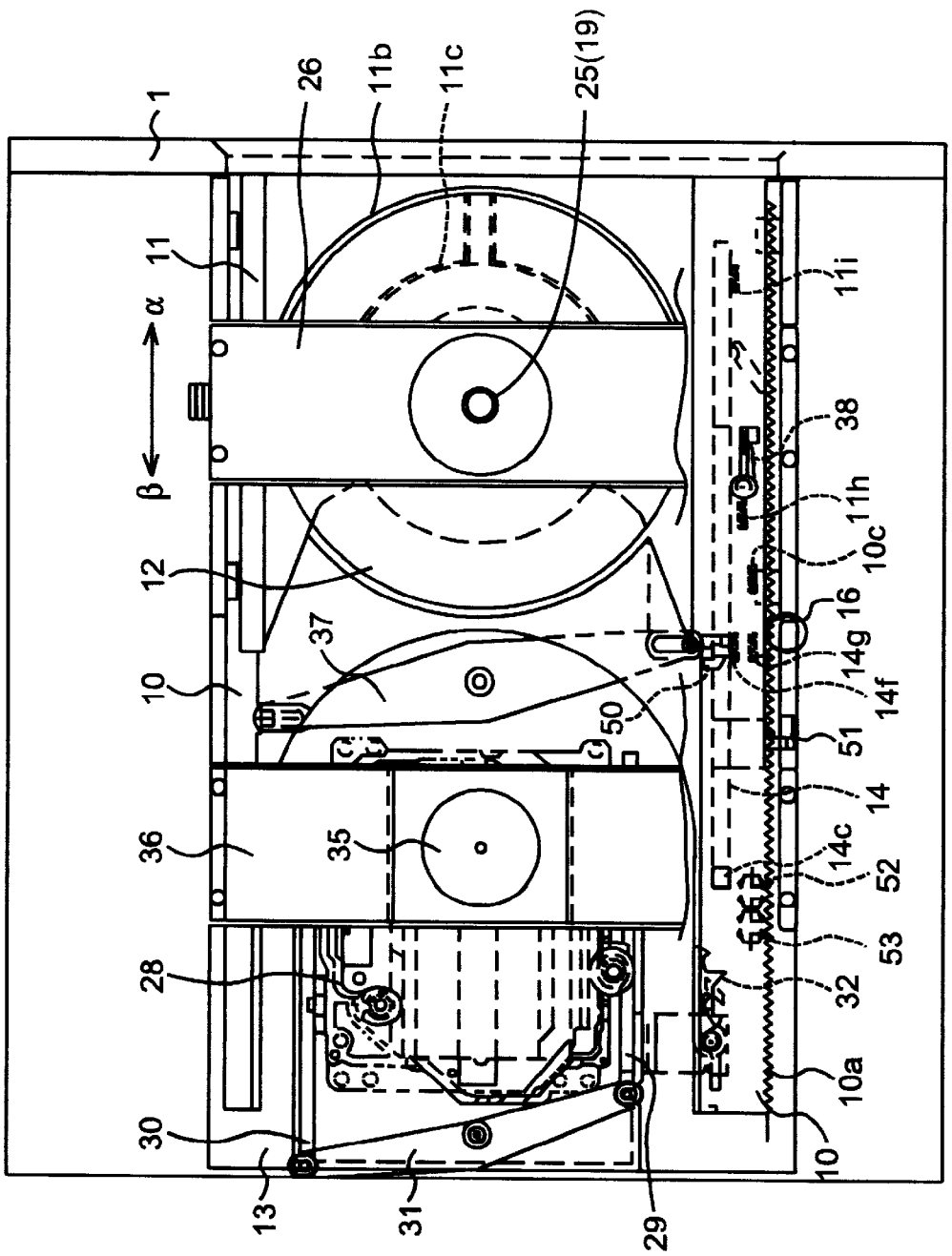
FIG. 8 is a partial cross sectional view showing the main tray of the disc changer according to the embodiment of this invention in which the main tray has entered the body.
Figure 9:
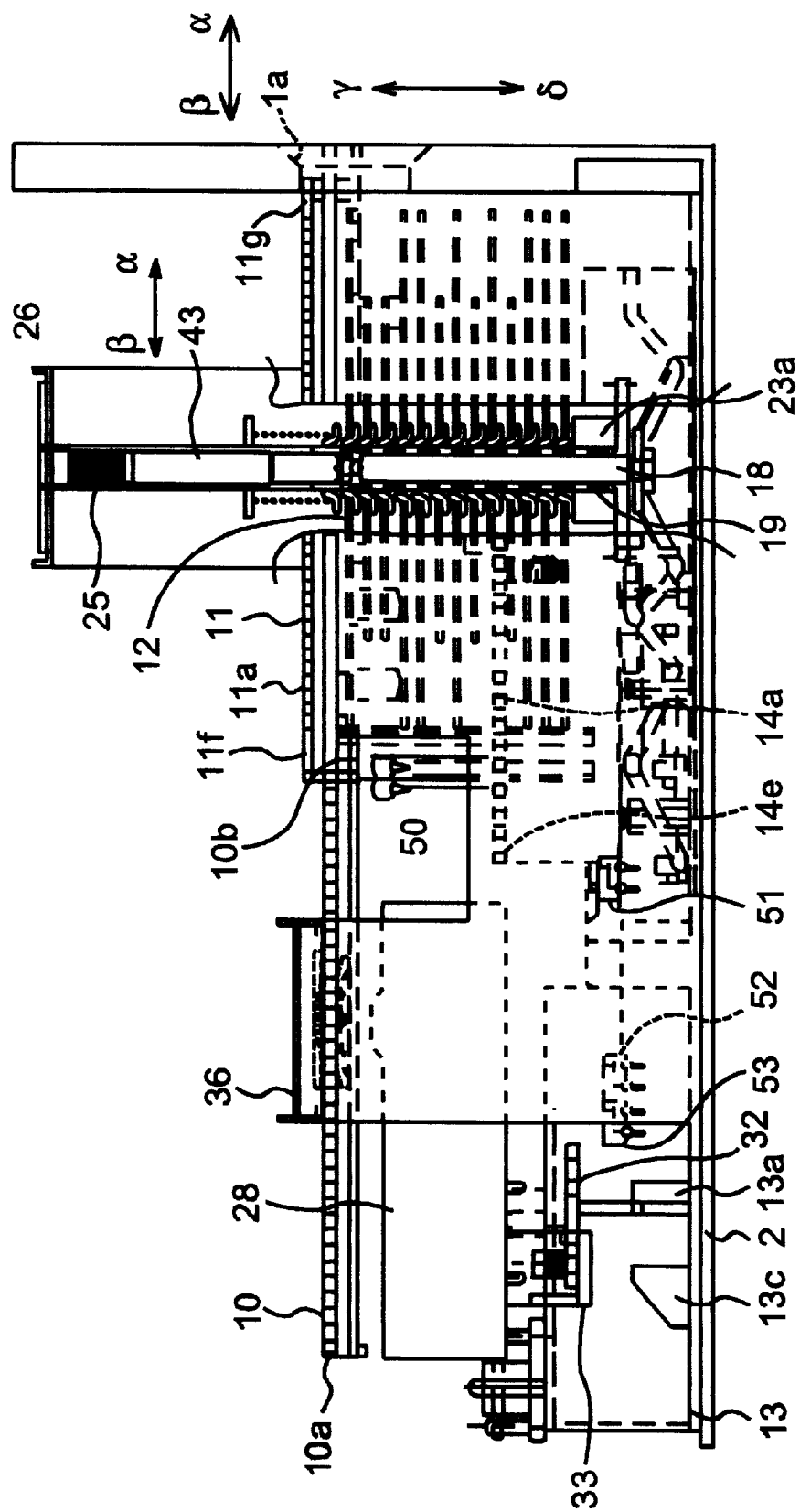
FIG. 9 is a partial cross sectional view showing the main tray of the disc changer according to the embodiment of this invention in which the main tray has entered the body.

In this state, when the disc 12 is fed on the subtray 11 and the open close knob 4 is pressed, the horizontal drive gear 16 drives and transfers the main tray in arrow direction β until the center of the subtray 11 and disc 12 is aligned with the center of the lower and upper spindles 19 and 25, as shown in FIGS. 8 and 9.

Shortly before the non-gear portion 10b of the main tray 10 is fed to the position of the horizontal drive gear 16 for disengagement, the protruding portion 10c of the main tray 10 presses the protruding portion 14g of the elevating cam 14 in arrow direction β to engage the gear portion 14a with the horizontal drive gear 16 starting with the non-gear portion 14e. This operation drives the elevating cam 14 in arrow direction β, while the movement of the main tray 10 in arrow direction β is stopped by the non-gear portion 10b. Thus, when the spindle base 17 is elevated in arrow direction γ by the elevating cam 14, the switch 51 is pressed by the elevating cam 14, which then stops its movement in arrow direction β, as shown in FIGS. 8 and 9.

In this case, the activating piece 38 is rotated by the spring 39 in arrow direction γ. In addition, the sound recording/reproduction device 28 is lowered in arrow direction δ.

Next, when the horizontal drive gear 16 is rotated to drive the elevating cam 14 in direction β, the spindle base 17 is lowered by the elevating cam 14 in arrow direction δ.

Shortly before the non-gear portion 14d of the elevating cam 14 is fed to the position of the horizontal drive gear 16 for disengagement, the pressed portion 38a of the activating piece 38 presses the protruding portion 11h of the subtray 11 to press the subtray 11 in arrow direction β, thereby engaging the gear portion 11a of the subtray 11, which has been stopped by the non-gear portion 11f, with the horizontal drive gear 16 to transfer the subtray 11 in arrow direction β. At this point, the main tray 10 is stopped at the non-gear portion 10b, while the elevating cam 14 is stopped at the non-gear portion 14d.

Figure 10:
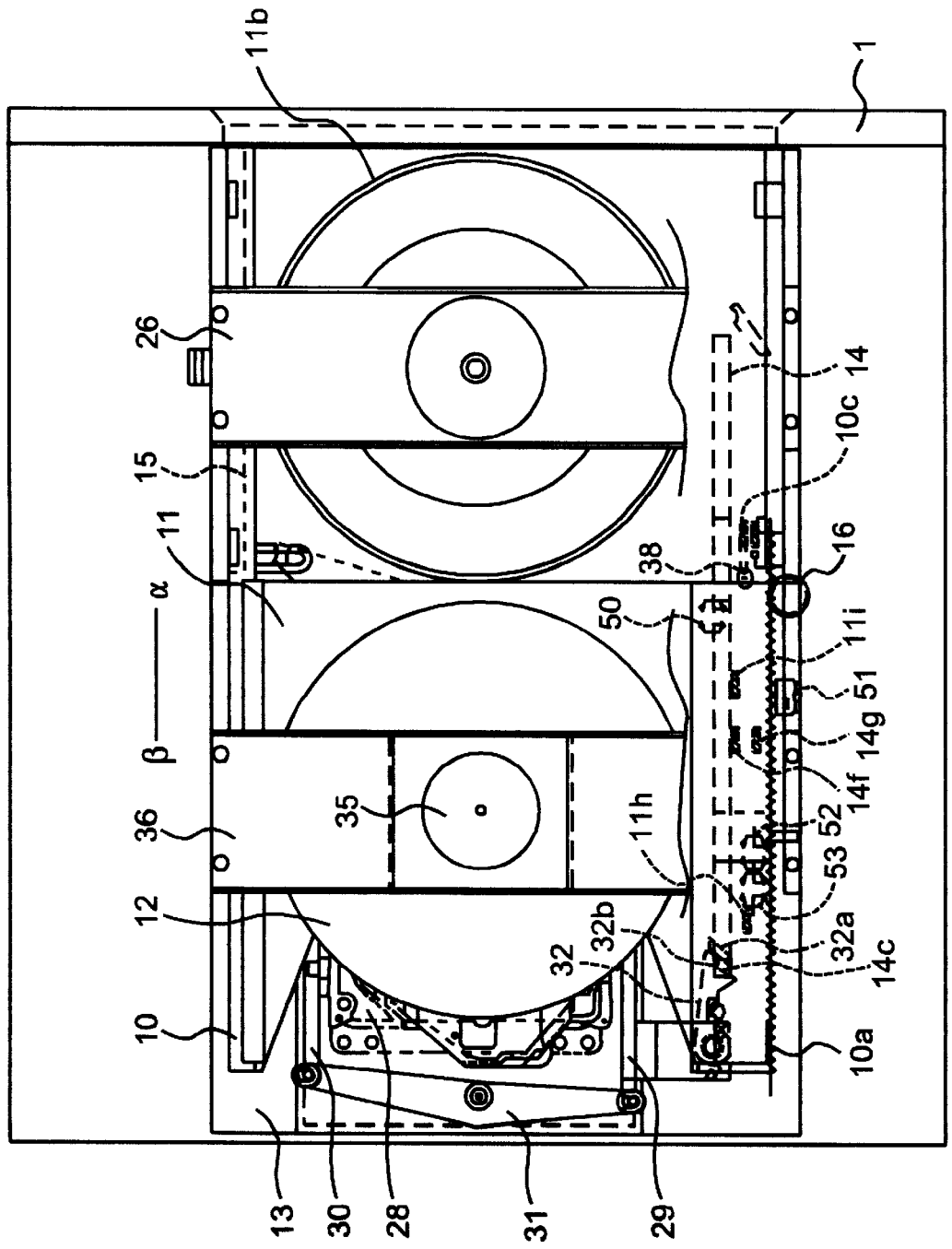
FIG. 10 is a partial cross sectional plan view showing the subtray of the disc changer according to the embodiment of this invention in which the subtray has transferred the disc to a sound recording/reproduction position for sound recording/reproduction.
Figure 11:
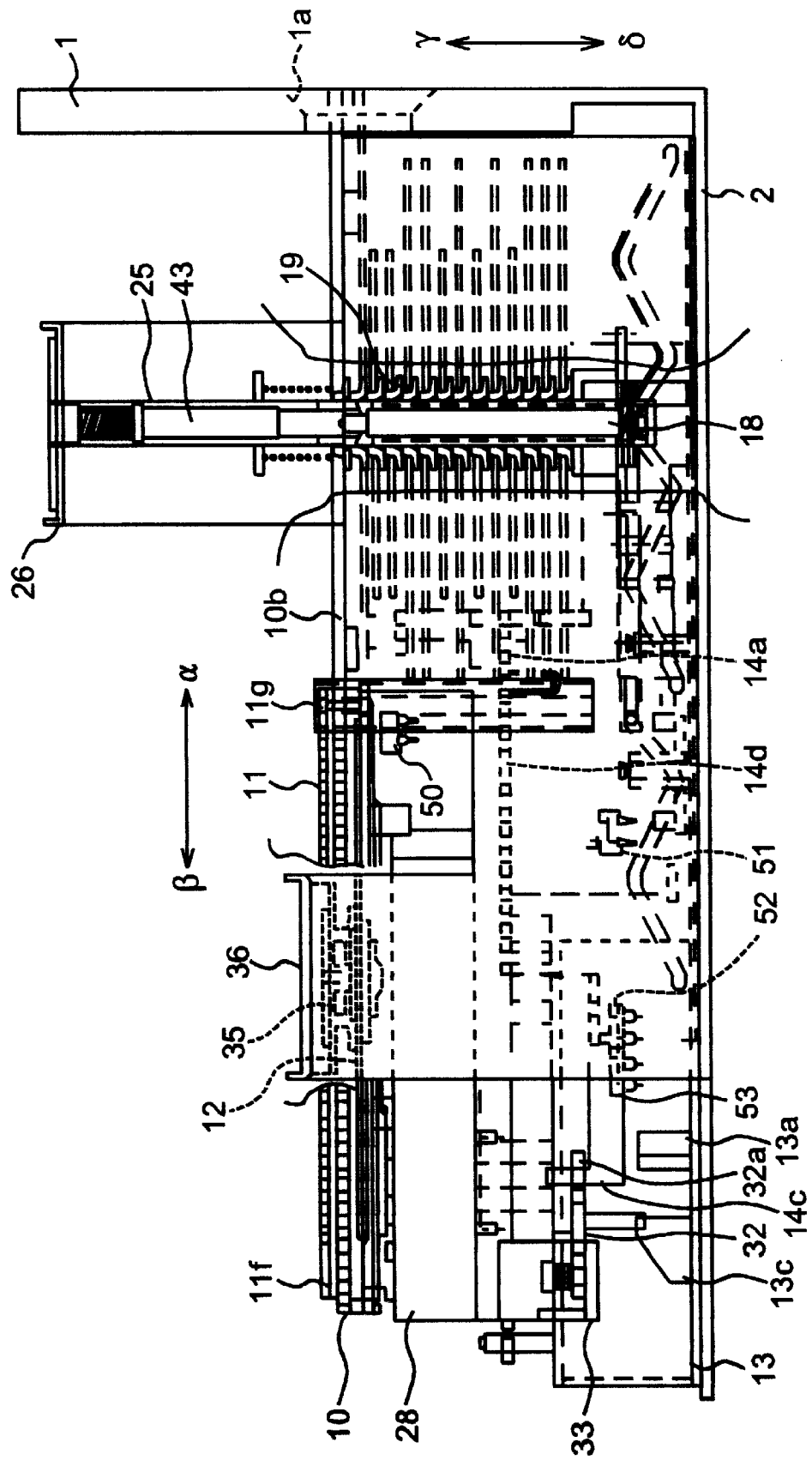
FIG. 11 is a partial cross sectional side view showing the subtray of the disc changer according to the embodiment of this invention in which the subtray has transferred the disc to a sound recording/reproduction position for sound recording/reproduction.

Furthermore, when the subtray 11 is transferred in arrow direction β, the protruding portion 11i of the subtray 11 presses the protruding portion 14f of the elevating cam 14 in arrow direction β, and the non-gear portion 11g of the subtray 11 stops the subtray 11. At the same time, the elevating cam 14 engages the horizontal drive gear 16 and is then driven in arrow direction β, as shown in FIGS. 10 and 11.

The spindle base 17 is elevated by the elevating cam 14 in arrow direction γ, and the protruding portion 14c of the elevating cam 14 presses a slope 32a at the tip of the hook 32 and engages a recessed portion 32b while rotating the hook in arrow direction κ. The stepped cam 29 is driven in arrow direction β and is stopped by the switch 52.

In this case, the sound recording/reproduction device 28 is elevated in arrow direction γ by the stepped cam 29, and the disc 12 is detached from the subtray 11 and then clamped between the sound recording/reproduction device 28 and the disc damper 35 for sound recording/reproduction.

Once the sound recording/reproduction has been finished and when the horizontal drive gear 16 drives the elevating cam 14 in arrow direction α, the protruding portion 14c of the elevating cam 14 drives the recessed portion 32b of the hook 32 in arrow direction α. The protruding portion 32c of the hook 32 is rotated in arrow direction κ by the slope 13b of the protruding portion 13a of the mechanical base 13, thereby disengaging the protruding portion 14c of the elevating cam 14 from the recessed portion 32b of the hook 32. The non-gear portion 14d of the elevating cam 14 subsequently stops the cam 14 from moving in arrow direction α. Shortly before this operation, however, the protruding portion 14f of the elevating cam 14 presses the protruding portion 11i of the subtray 11 in direction α to engage the horizontal drive gear 16 with the gear portion 11a of the subtray 11, thereby allowing the subtray 11 to be transferred in arrow direction α together with the disc 12.

In this case, the spindle case 17 has been lowered in arrow direction δ, and the sound recording/reproduction device 28 has been lowered in arrow direction δ by the stepped cam 29.

Once the subtray 11 and the disc 12 has been transferred in arrow direction α and when the center of the disc 12 approaches the center of the lower and upper spindles 19 and 25 (see FIGS. 8 and 9), the protruding portion 11h of the subtray 11 presses the pressed portion 38a of the activating piece 38 in arrow direction α, and the elevating cam 14 engages the horizontal gear 16 and is driven in arrow direction α, thereby elevating the spindle base 17 in arrow direction γ, which is then stopped by the switch 51.

Then, when the elevating cam 14 is driven in direction α by the horizontal drive gear 16, the spindle base 17 is lowered in arrow direction δ. The movement of the elevating cam 14 in arrow direction α is stopped by the non-gear portion 14e but shortly before this operation, the protruding portion 14g of the elevating cam 14 presses the protruding portion 10c of the main tray 10 in arrow direction α, and the main tray 10, which is stopped by the non-gear portion 10b, engages the horizontal drive gear 16 and is then transferred in arrow direction α together with the subtray 11 and the disc 12. In this case, the activating piece 38 has been rotated in arrow direction κ by the protruding portion 13a of the mechanical base 13, and the protruding portion 11h of the subtray 11 passes through in arrow direction α without contacting the pressed portion 38a. As a result, the main tray 10, subtray 11, and disc 12 exit the front panel 1 in arrow direction α for so as to change the disc 12, as shown in FIGS. 5 to 7.

Next, the configuration of a transfer switching means is described with reference to FIGS. 12 to 15. The operation is normally performed as shown in FIGS. 5 to 11, but when, in FIGS. 10 and 11, another disc on both spindles 19, 25 is changed without stopping the sound recording/reproduction of the disc 12, the No. keys 3 and the open close knob 4 are operated to further drive the elevating cam 14 using the horizontal drive gear in arrow direction β. The elevating cam 14 is stopped by the switch 53.

Figure 13:
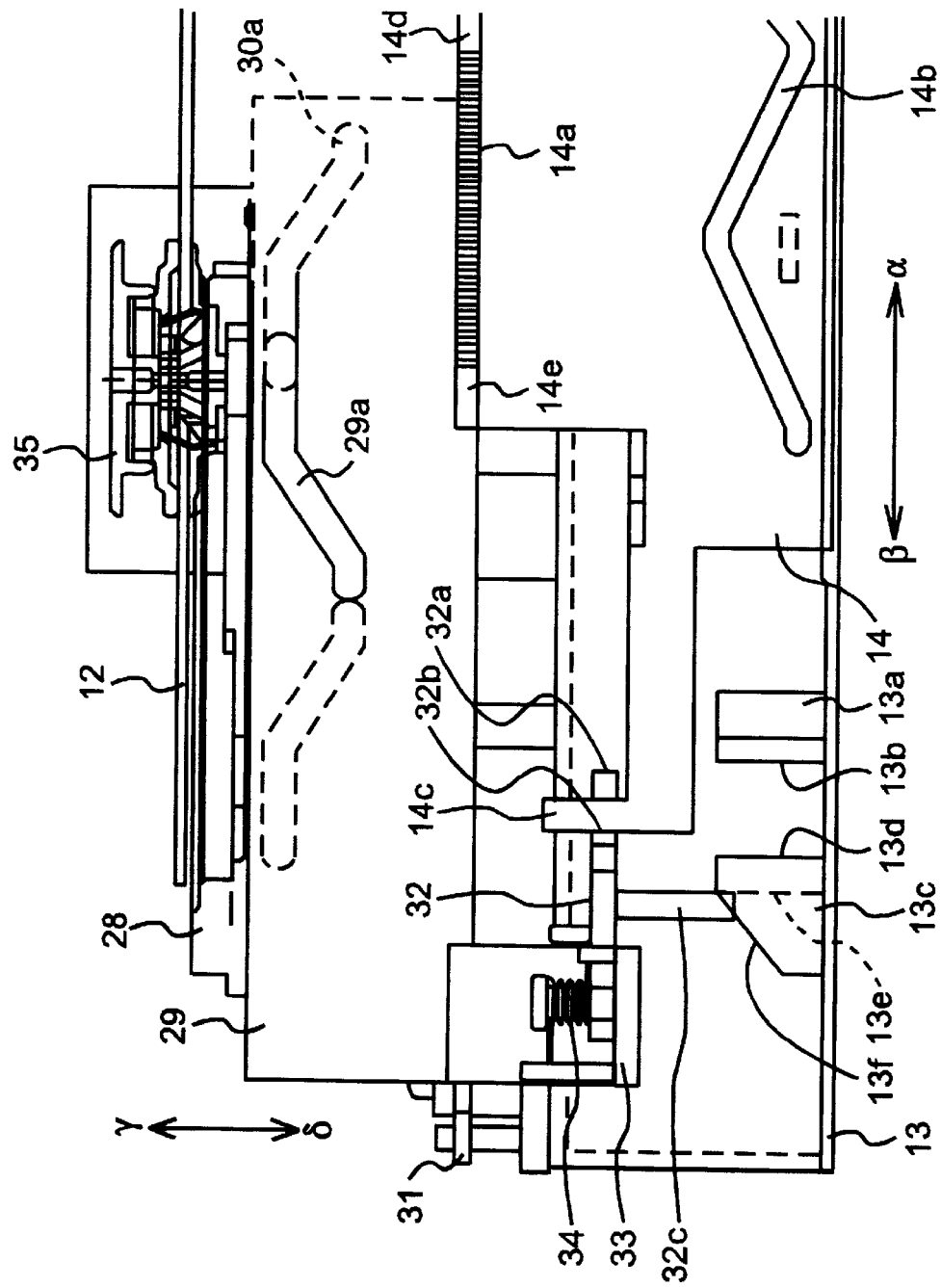
FIG. 13 is a partial cross sectional side view of the disc changer according to the embodiment of this invention in which the disc is changed during sound recording/reproduction.

In this case, the protruding portion 32c of the hook 32 passes through while being rotated in arrow direction κ by the slope 13d of the protruding portion 13c of the mechanical base 13, and engages a stopper portion 13e as shown in FIGS. 1 and 13.

When the elevating cam 14 is subsequently driven in arrow direction α, the protruding portion 14c is disengaged from the recessed portion 32b of the hook 32. The hook 32 remains stopped, and the sound recording/reproduction device 28 is stopped from elevating in arrow direction γ to continue sound recording/reproduction. The elevating cam 14 is driven in arrow direction α and cooperates with the subtray 11 and main tray 10 vertically separated from the disc 12 in order to change another disc on both spindles 19, 25.

Figure 12:
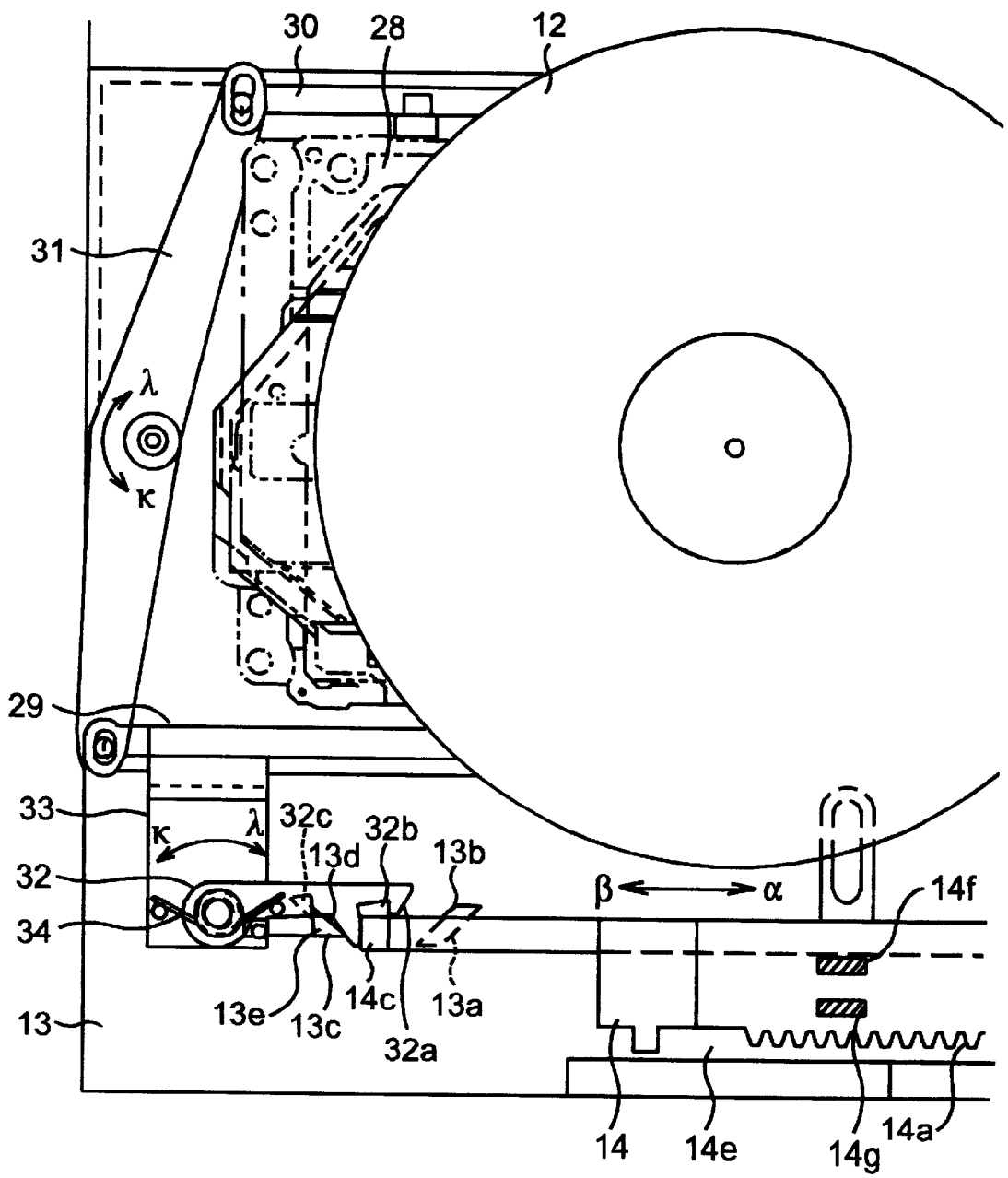
FIG. 12 is a partial cross sectional plan view of the disc changer according to the embodiment of this invention in which the disc is changed during sound recording/reproduction.
Figure 14:
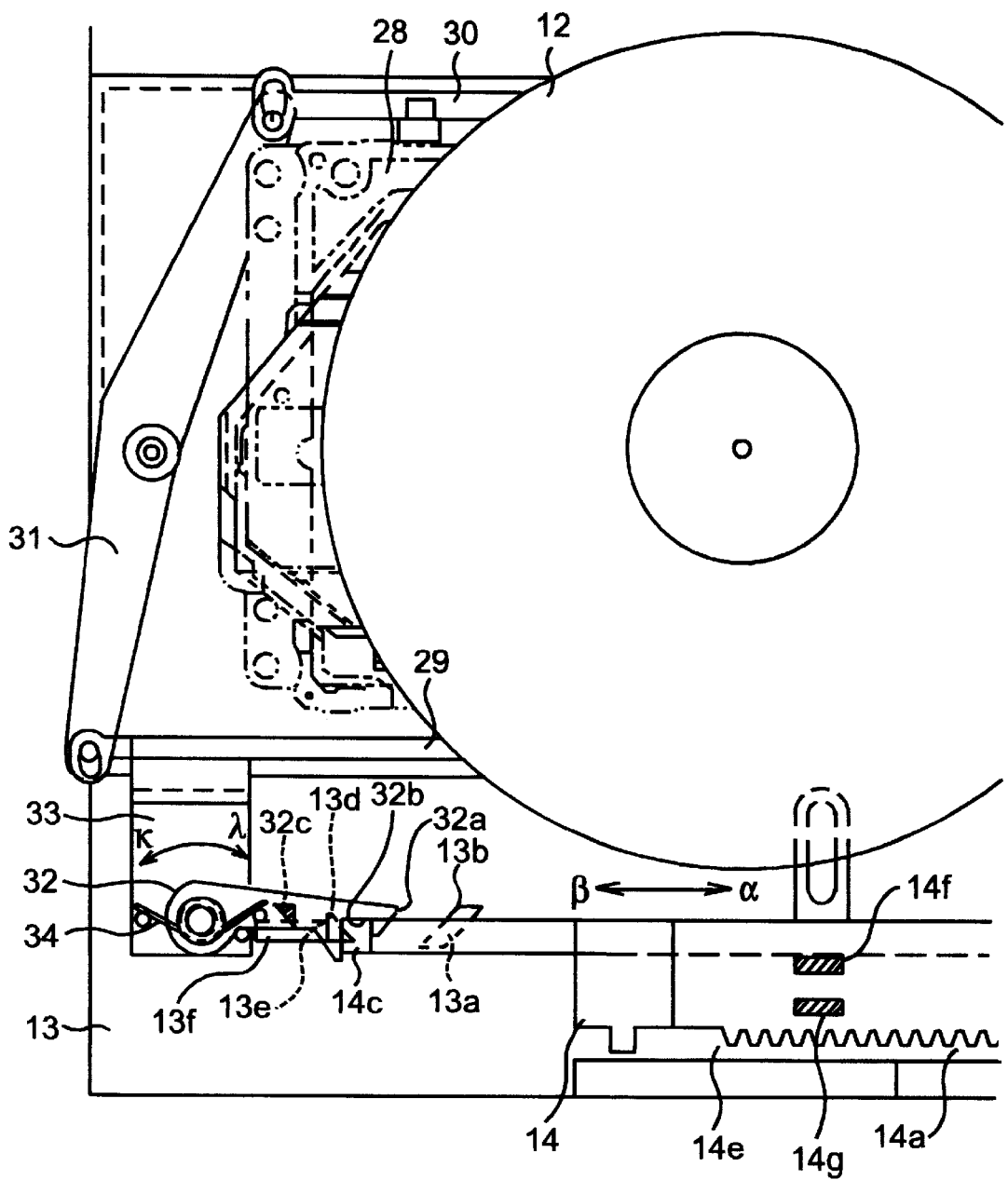
FIG. 14 is a partial cross sectional plan view of the disc changer according to the embodiment of this invention in which the disc is released during sound recording/reproduction.
Figure 15:
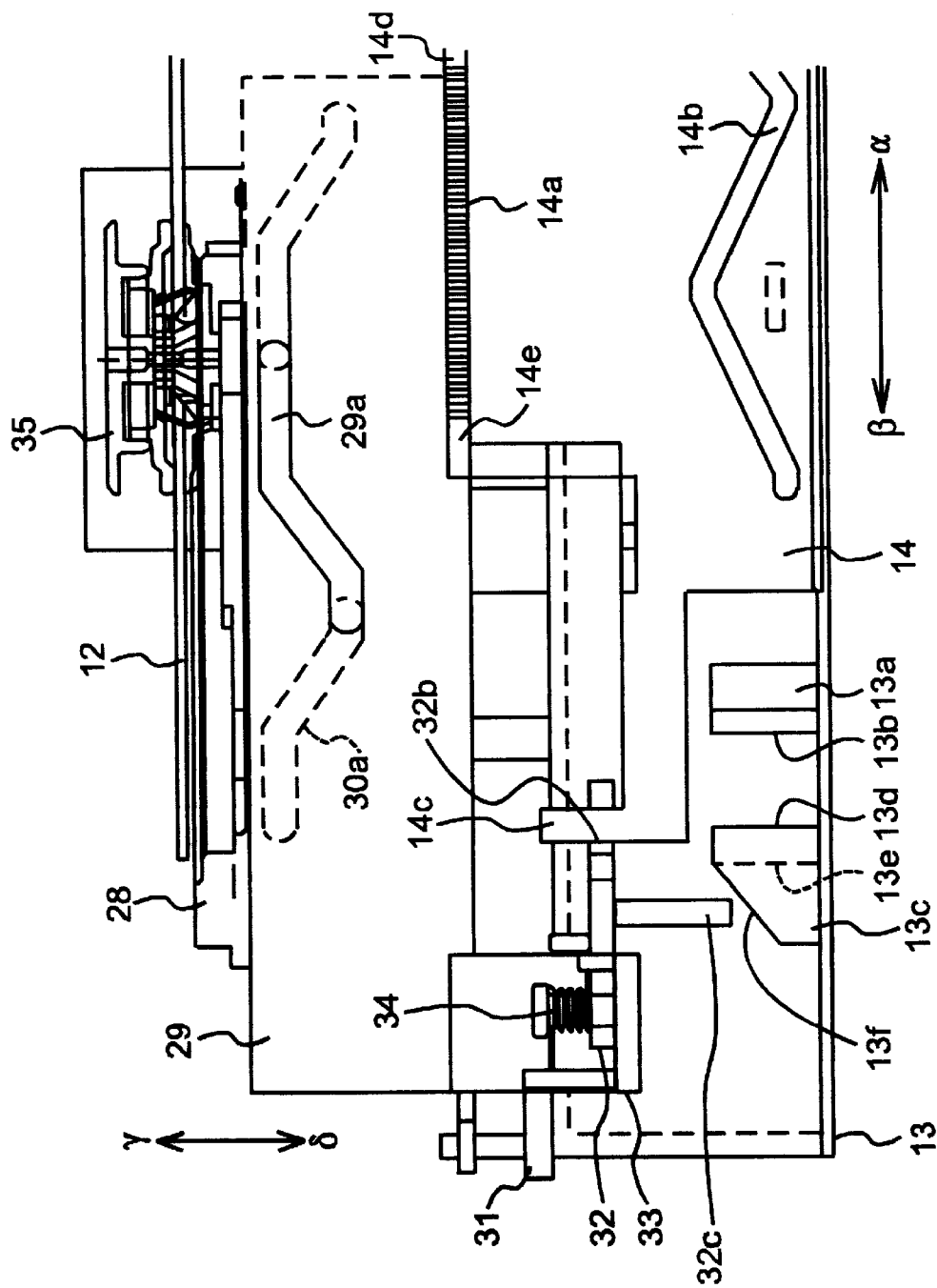
FIG. 15 is a partial cross sectional side view of the disc changer according to the embodiment of this invention in which the disc is released during sound recording/reproduction.

Next, when the No. keys 3, open close knob 4, and start stop knob 5 are operated to remove or change the disc 12 being sound recorded or reproduced with another, the elevating cam 14 is further driven in direction of arrow β from the position in FIGS. 12 and 13, as shown in FIGS. 14 and 15.

In the figures, when the protruding portion 14c of the elevating cam 14 further presses the hook 32 in arrow direction β, the protruding portion 32c of the hook 32 is detached from the stopper portion 13e of the mechanical base 13 and moved onto a tilted portion 13f to cause the protruding portion 32c to leave the protruding portion 13c. The hook 32 is then rotated in arrow direction λ by the spring 39.

When the elevating cam 14 is then moved in arrow direction α, the protruding portion 14c drives the recessed portion 32b of the hook 32 in arrow direction α, and the protruding portion 32c of the hook 32, which is constantly pressed downward in arrow direction δ by the spring 34, passes over the protruding portion 13c while pressing the tilted portion 13f of the mechanical base 13 and then returns to its normal position shown in FIGS. 10 and 11.

The configuration of the change of the disc between both spindles 19, 25 using the disc handling, vertical drive, and spindle drive means is described with reference to FIGS. 16 to 21.

The configuration of the elevation return means is first described. The spacer 40 configured to be fitted on both spindles 19 and 25 to support the disc is elevated up to the origin of the spacer once one cycle of disc change operation has been finished, that is, the spacer 40 of No. 0 is elevated in arrow direction γ by the lower elevating table 23 until it engages the upper spindle 25 prior to resetting.

At this point, each spacer 40 of No. 0 to No. 12 compresses a disc presser spring (an urging device) 42 provided as a disc presser means between the bottom surface portion of a guide hole 24b for the upper spindle 25 formed in the upper elevating table 24 and a disc presser 41 fitted on the upper spindle 25, and are sandwiched between the top surface 23c of the lower elevating table 23 and the disc presser 41 to prevent a plurality of discs 12 from slipping out from the spacer 40.

The configuration of the disc holding means is then described. In the figures, a plurality of claw portions 27a formed on the outer circumference of the holding claw 27 can enter and exit a plurality of slits 25a formed in the outer circumference of the upper spindle 25.

Figure 20:
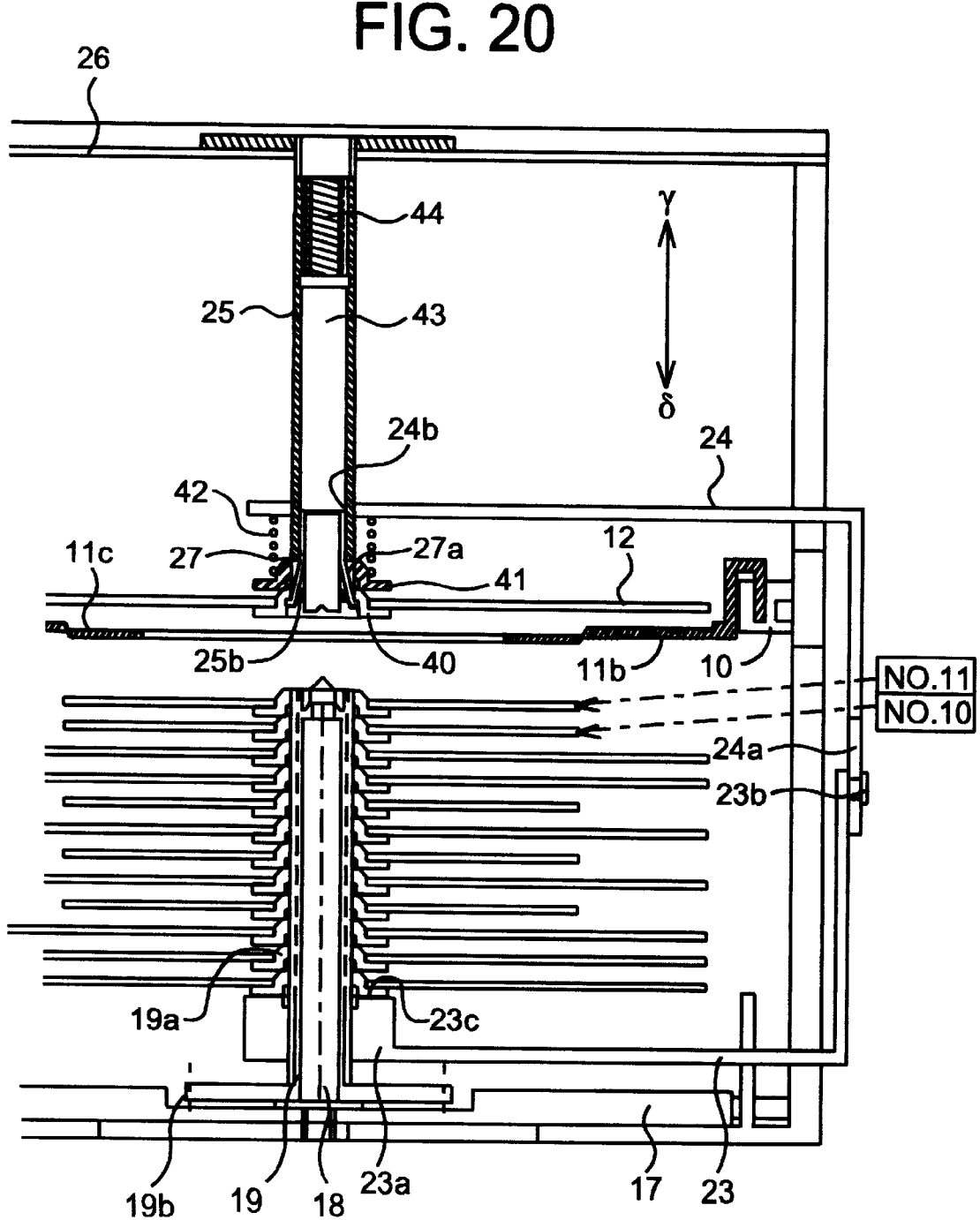
FIG. 20 is a cross sectional front view of the disc changer according to the embodiment of this invention in which the disc is being removed from the center spindle.
Figure 22:
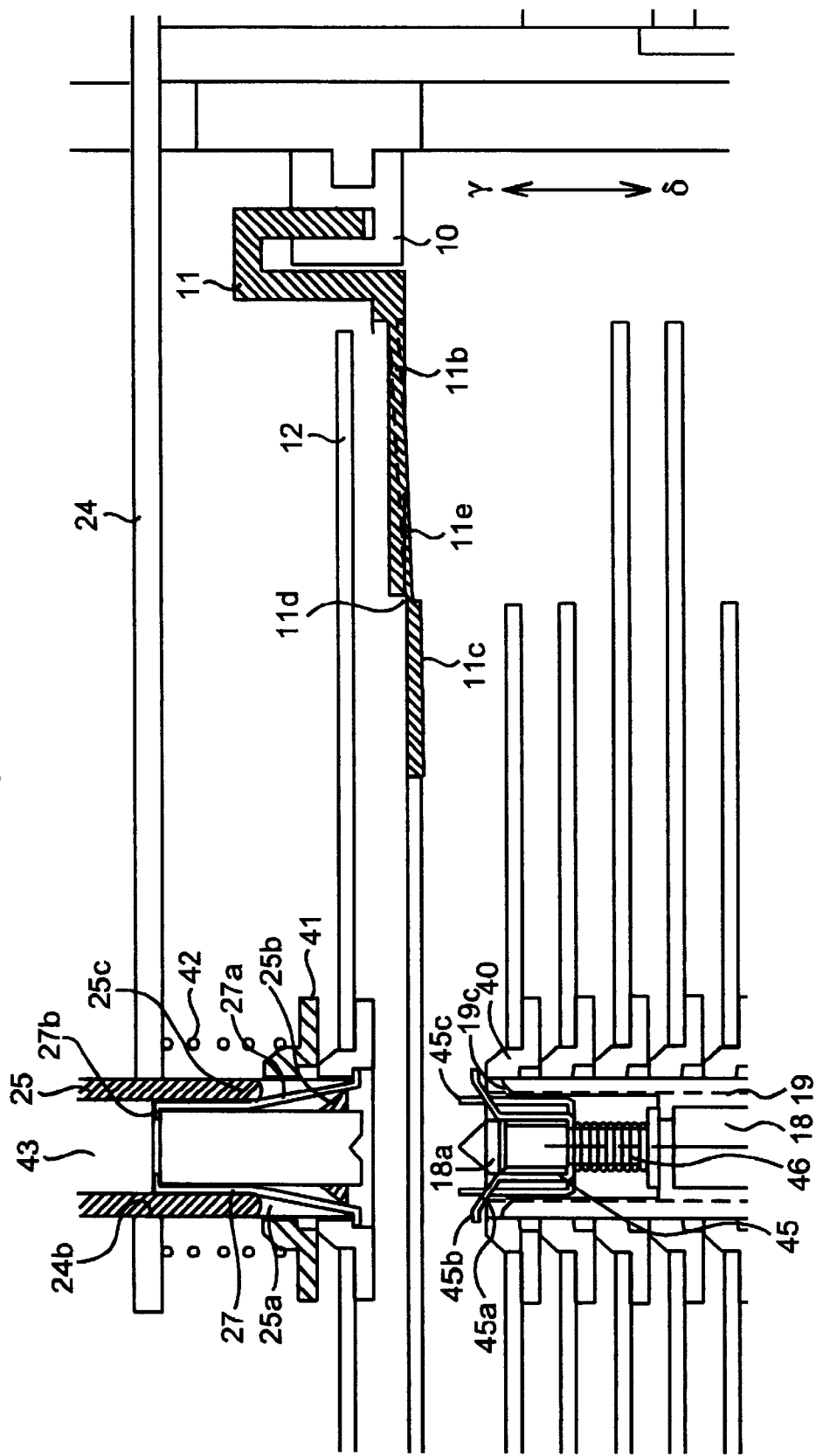
FIG. 22 is a cross sectional front view of the disc changer according to the embodiment of this invention illustrating a method for preventing the spacer from slipping out when a lower spindle is lowered.

A lower central shaft 43 is fitted in the upper spindle 25 so as to slide in arrow direction γ–67 for a specified amount, and the top 27b of the holding claw 27 engages the bottom of the lower central shaft 43 to press the shaft upward in arrow direction δ using a claw-opening spring 44. A pressed portion formed on the lower part of the upper spindle 25 allows the plurality of claw portions 27a of the holding claw 27 to protrude from the outer circumference of the upper spindle 25 to hold the spacer 40 or the disc presser 41, as shown in FIGS. 17, 20, and 22.

When the lower central shaft 18 is pressed upward in arrow direction γ by the spindle base 17, a pressed portion 25c formed above the slit 25a in the upper spindle 25 causes the plurality of claw portions 27a to be housed inside the upper spindle 25, thereby allowing the spacer 40 to pass along both spindles 19, 25 in the vertical direction, as shown in FIGS. 16, 18, 19, 21, and 23.

When the disc 12 is in its sound recording/reproduction position as shown in FIGS. 10 and 11 and is returned to the spacer No. 12 40 from the origin of the spacer shown in FIG. 16, the lower spindle 19 is rotated to lower with the upper and lower elevating tables 24 and 23 until the top surface of the spacer No. 12 40 is flush with the top surface 19c of the lower spindle 19, thereby determining the position of the disc.

Figure 17:
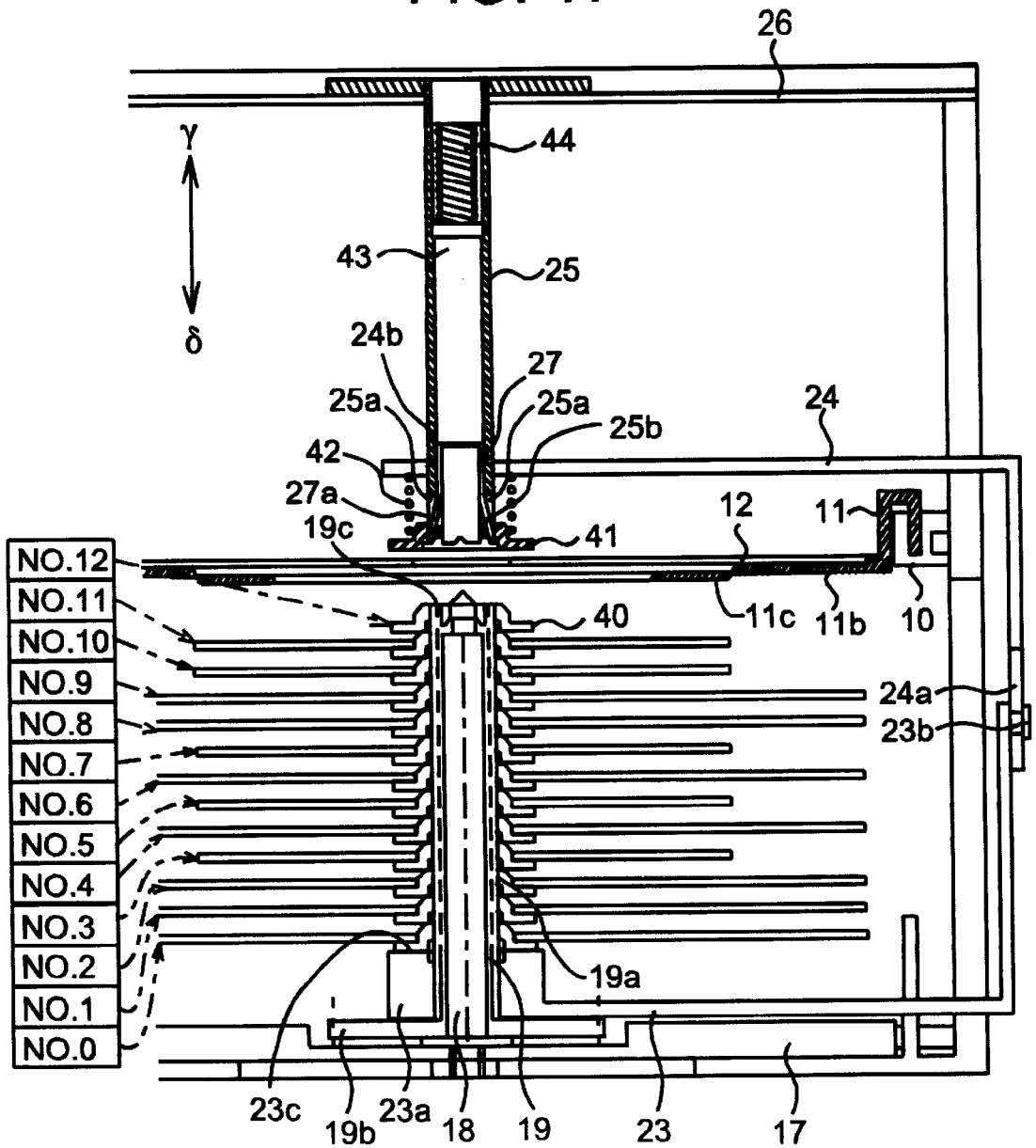
FIG. 17 is a cross sectional front view of the disc changer according to the embodiment of this invention in which the disc has not been housed on the center spindle yet.
Figure 18:
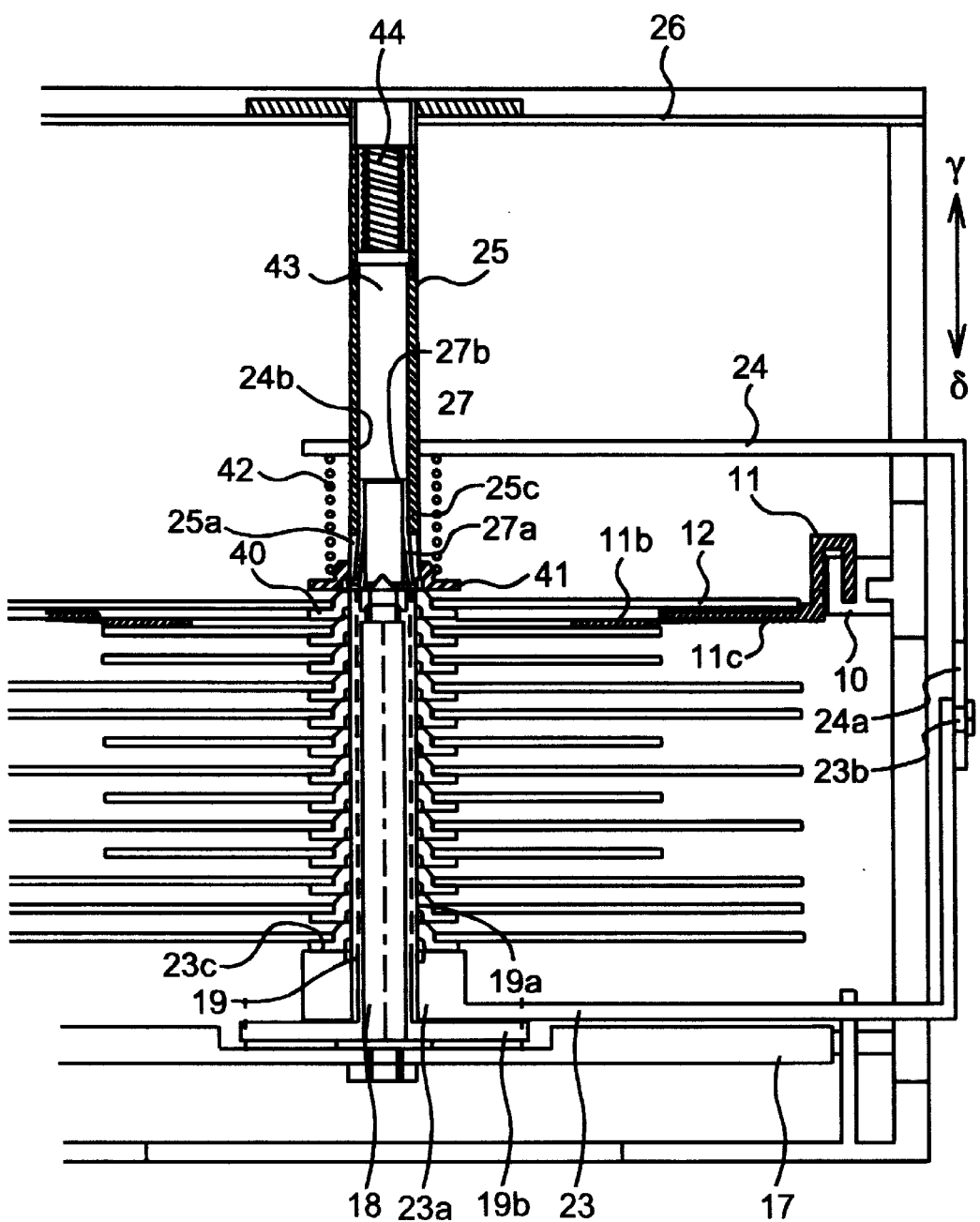
FIG. 18 is a cross sectional front view of the disc changer according to the embodiment of this invention in which the disc has been housed on the center spindle.

Then, when the elevating cam 14 is driven in arrow direction α, the spindle base 17 is lowered in arrow direction δ, and the holding claw 27 supports the disc presser 41 on the upper spindle 25 as shown in FIG. 17. The disc 12 is then transferred with the subtray 11 so that the center of the disc 12 is aligned with the center of both spindles 19, 25. The lower spindle 19 is then elevated in arrow direction γ by the spindle base 17, and the holding claw 27 is housed inside the upper spindle 25 as shown in FIG. 18.

Figure 19:
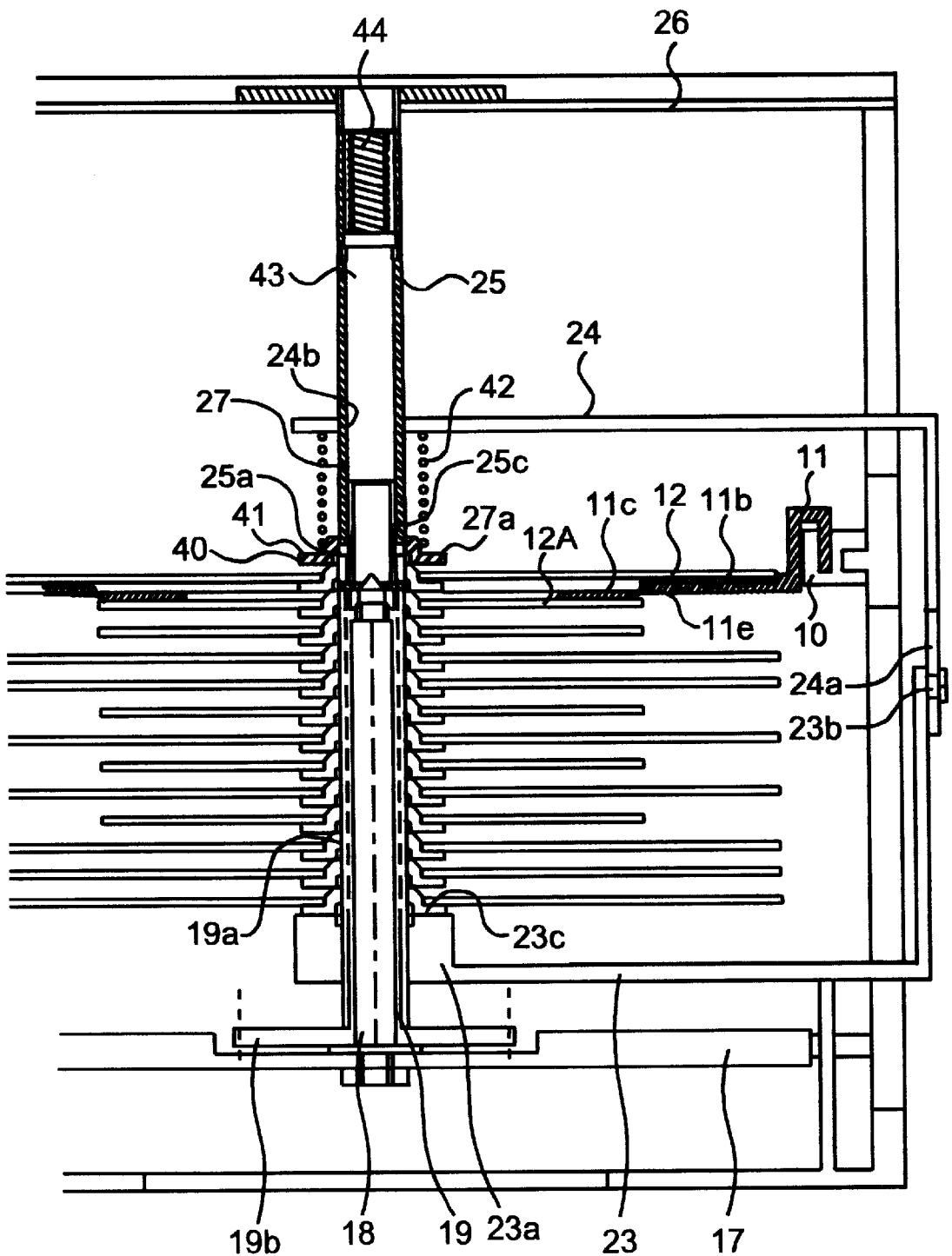
FIG. 19 is a cross sectional front view of the disc changer according to the embodiment of this invention in which the removal of the disc from the center spindle is started.

Next, the lower spindle 19 is rotated to drive the spacer 40 one pitch in arrow direction γ together with the subtray 11, as shown in FIG. 19. In this case, the thickness of the spacer 40 can be further reduced if the disc pitch reduction means is used to flex the connecting section 11e to make the 8 cm disc loading section 11c flush with the 12 cm disc loading section 11b when a lower disc 12A raises the subtray 11 in arrow direction γ.

The spindle base 17 is then driven in arrow direction δ to cause the plurality of claw portions 27a to protrude from the outer circumference of the upper spindle 25 to hold the disc 12 in conjunction with the spacer No. 12 40, as shown in FIG. 20. The subtray 11 is lowered and leaves the disc 12 and the spacer No. 12 40 to separate the lower spindle 19 from the upper spindle 25.

Figure 21:
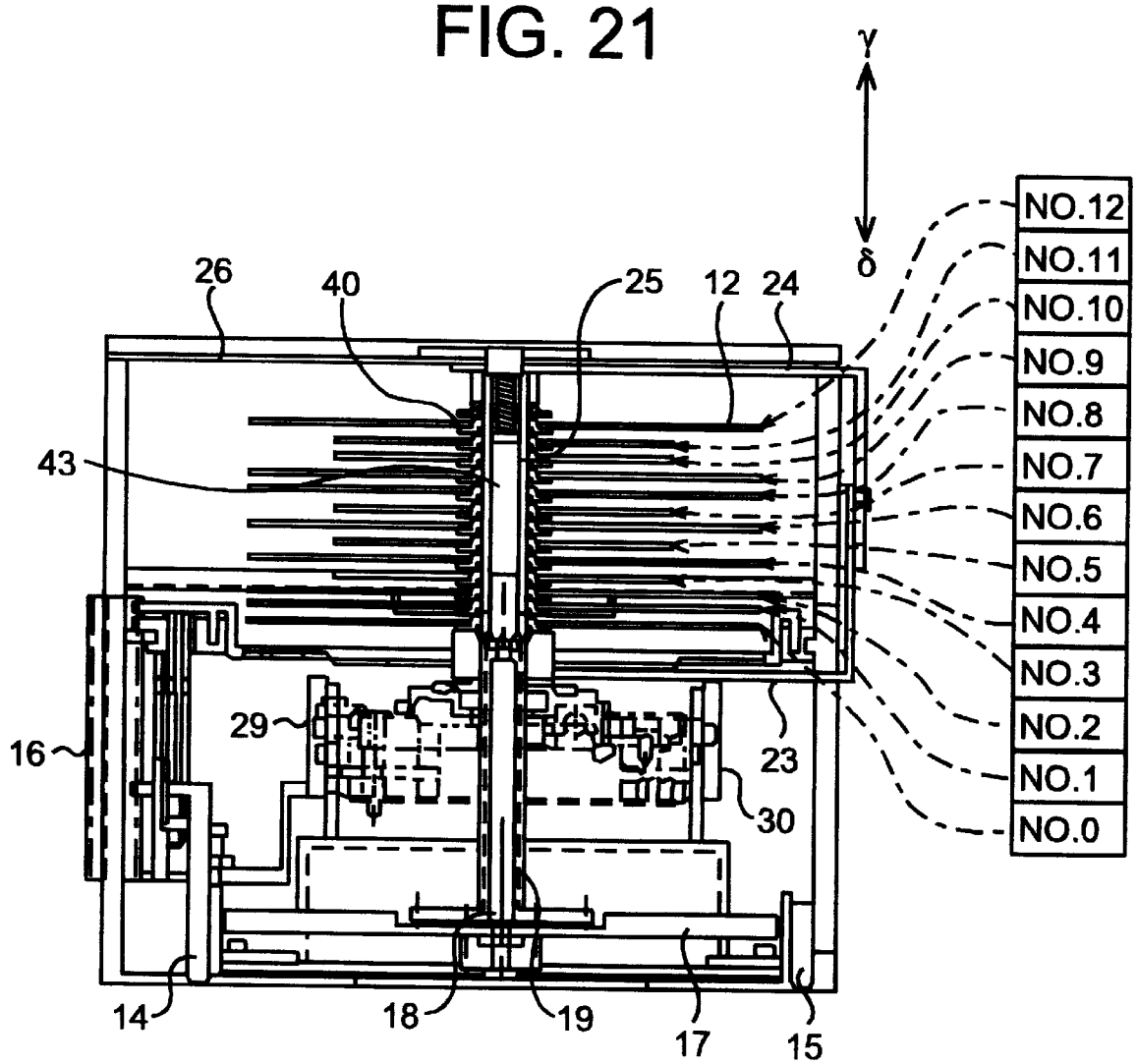
FIG. 21 is a cross sectional front view of the disc changer according to the embodiment of this invention in which the disc is housed on the center spindle.

The empty subtray 11 is then returned to the sound recording/reproduction position shown in FIGS. 10 and 11, while the lower spindle 19 is simultaneously rotated to elevate the spacer 40 and the disc 12 in arrow direction γ to return them to their origin, as shown in FIG. 21.

Next, when the spacer No. 12 for the disc 12 in the condition shown in FIG. 21 is transferred to the sound recording/reproduction position, a spacer No. 11 40 is aligned with the upper end of the lower spindle 19 and the spindle base 17 is driven and opened in arrow direction δ, as shown in FIG. 20.

The spindle base 17 is then driven in arrow direction γ to house the holding claw 27 inside the upper spindle 25, as shown in FIG. 19.

Furthermore, the lower spindle 19 is rotated to lower the lower elevating table 23 one pitch for the spacer 40 in arrow direction δ, as shown in FIG. 18.

The spindle base 17 is lowered and opened in direction δ to lower the disc 12 on the spacer No. 12 40, onto the subtray 11, as shown in FIG. 17.

The subtray 11 with the disc 12 loaded thereon is subsequently transferred to the sound recording/reproduction position shown in FIGS. 10 and 11 in order to start sound recording/reproduction. In this case, the spindle case 17 is driven in arrow direction γ to close the upper and lower spindles 25 and 19, and the lower spindle 19 is rotated to drive the lower elevating table 23 in arrow direction γ up to its origin, as shown in FIG. 16.

The above configuration enables any disc on one of the spacers No. 0 to No. 12 40 to be transferred from between both spindles 19, 25 to the sound recording/reproduction or removal position and back to the housing position between both spindles 19, 25.

Figure 23:
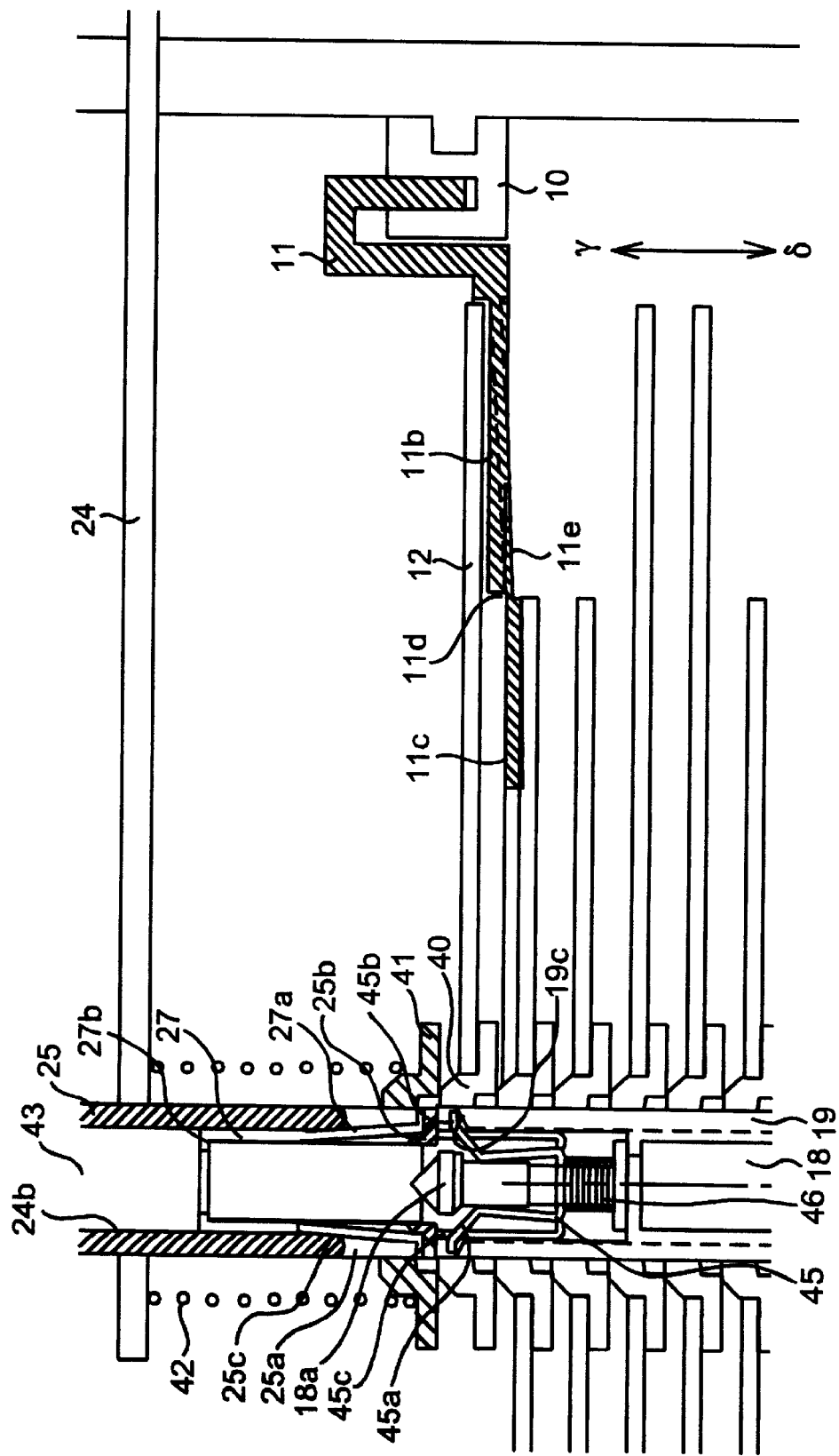
FIG. 23 is a cross sectional front view of the disc changer according to the embodiment of this invention illustrating a method for preventing the spacer from slipping out when the lower spindle of the spacer is elevated.

FIGS. 22 and 23 shows the configuration of a spacer detachment prevention means for preventing the spacer 40 from slipping out from the top surface 19c of the lower spindle 19 when the spindle 19 is opened or closed in arrow direction γ–δ in the above configuration.

A detachment prevention claw 45 configured to slide in arrow direction γ–δ in the upper part of the lower central shaft 18 is constantly pressed upward in direction γ by a compression spring 46 to cause a protruding portion 18a of the lower central shaft 18 to press a plurality of claw portions 45a, thereby allowing the tips 45b of the claws to protrude from the outer circumferential portion of the lower spindle 19 in order to prevent the spacer 40 from slipping out from the lower spindle 19.

Once the lower spindle 19 has been pressed upward in arrow direction γ with the lower central shaft 18, the upper end 45c of the detachment prevention claw 45 is pressed downward by a pressing section 25b formed at the lower end of the upper handle 25, and the plurality of claw portions 45a of the detachment prevention claw 45 having the shape shown in FIG. 23 and made of a spring material leave the protruding portion 18a of the lower central shaft 18 and are closed, allowing the spacer 40 to pass between the upper and lower spindles 25 and 19 smoothly, as shown in FIG. 23, thereby the tip 45b of the claw portions 45a being constantly positioned inside the lower spindle 19.

The operation of the disc changer configured as described above according to one embodiment of this invention is described.

In FIG. 1, when the disc 12 on the subtray 11 is changed and the open close knob 4 is pressed, the main tray 10 is moved in arrow direction β as shown in FIGS. 8 and 9, and loaded until the center of the disc 12 is aligned with the center of both spindles 19, 25, and the lower spindle 19 is opened and closed in the vertical direction.

The disc 12 is further transferred in arrow direction β up to the sound recording/reproduction position as shown in FIGS. 10 and 11, and the lower spindle 19 is elevated and closed. The sound recording/reproduction device 28 is also elevated to clamp the disc 12 and starts sound recording/reproducing the disc. When the open close knob 4 is then pressed again, the disc 12 is transferred up to a disc change position by the main tray 10 and the subtray 11, as shown in FIG. 1.

When a different No. key 3 and then the start stop knob 5 are pressed while the disc 12 is being sound recorded or reproduced at the position in FIGS. 10 and 11, the disc 12 is returned to its specified position on both spindles 19, 25 and the newly specified disc on both spindles 19, 25 is transferred to the sound recording/reproduction position to start sound recording/reproduction thereon. The spacer 40 is elevated and return to its origin, as shown in FIG. 16. When no disc is specified, "NO DISC" is displayed in a display section 7.

Next, when a No. key 3 different from the one corresponding to the disc being sound recorded or reproduced is pressed and the open close knob 4 is then pressed, the disc being sound recorded or reproduced continues to be sound recorded or reproduced, whereas the disc 12 corresponding to the specified No. is removed from between the spindles 19, 25 and moved to the disc change position shown in FIG. 1.

When the disc on the subtray 11 is then changed and the open close knob 4 is pressed, the new changed disc is housed on both spindles 19, 25.

Next, the operation performed when the power button 6 is pressed to start sound recording/reproduction is described.

The power button 6 is first turned on to light the No. keys 3. When any No. key 3 is specified and pressed and the open close knob 4 is then pressed, the specified disc 12 is removed from between both spindles 19, 25 and moved to the disc change position shown in FIG. 1. When no disc is specified, the empty subtray 11 is moved out.

When a new disc is then fed on the subtray 11 and the open close knob 4 is then pressed, the disc is housed at the specified position on both spindles 19, 25, and the spacer 40 is elevated to return to its origin as shown in FIG. 16. The above operation can be performed in a known manner using the motor (not shown), vertical feed detection switch 22, switches 50, 51, 52, 53, No. keys 3, open close knob 4, start stop knob 5, display section 7, and microcomputer.

Figure 24:
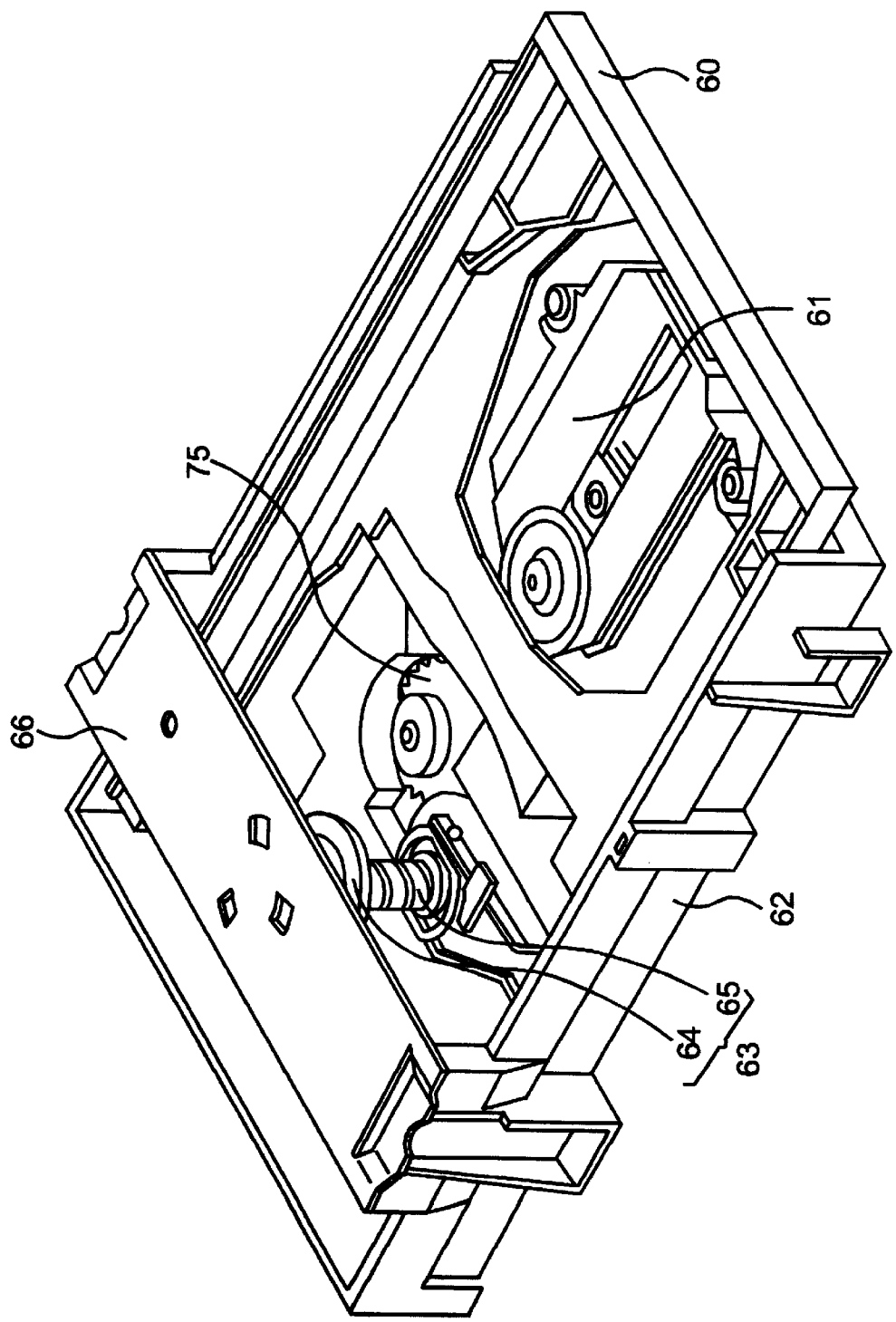
FIG. 24 is a perspective view of the appearance of an input section (a mechanical section) of a disc changer according to a second embodiment of this invention.

Next, a second embodiment of this invention is described. FIG. 24 is a perspective view of a disc changer according to the second embodiment of this invention with part of an input section (a mechanical section) removed. In this figure, the subtray is provided on the main tray 60 so as to slide in the longitudinal direction but is omitted from FIG. 24.

Unlike the configuration of the above embodiment, the input section of the second embodiment has a sound recording/reproduction device 61 disposed in the front of a mechanical base 62 (the front corresponds to the lower right in FIG. 24) and a spindle 63 located in the rear, so that a rotating disc can be observed from the front panel.

The spindle 63 in the second embodiment is different from the corresponding configuration in the above embodiment. The spindle 63 is composed of an upper spindle 64 and a lower spindle 65, the upper spindle 64 has a flange 64b at the upper end of an upper spindle body 64a, and an engagement piece 64c formed on the flange 64b engages an engagement hole 66a formed in a spindle mounting plate 66.

A disc presser 67 is fitted on the outer circumference of the upper spindle body 64a so as to be moved along a vertical groove 64e. The disc presser 67 is urged downward by a disc presser spring 69.

A holding claw 70 is housed inside the upper spindle body 64a. The holding claw 70 is formed by using a synthetic resin to integrally mold a claw portion 70a that holds a spacer 71 on the upper spindle 64, a core portion 70b with which a protruding portion 65a in the lower spindle contacts, and an upper stopper 70c.

Although the holding claw 70 is urged downward by a claw-opening spring 72, it is prevented by a pressing section 64d from slipping out. The pressing section 64d is integrally molded with the upper spindle body 64a and is contacted by the tip of a downward-pressing piece 73a of a detachment prevention claw 73, which is described below.

Since the root of the claw portion 70a is made of a thin plate, the claw portion can be bent inward and outward. The tip 70d of the claw portion 70a is shaped like a hook and that part of the claw portion 70a which contacts the upper spindle body 64a is tilted inward.

The core portion 70 of the holding claw has three vertical grooves 70e at positions that are contacted by the tip 70d of the claw portion 70a so that the tip 70d can sufficiently retreat into the upper spindle body 64a.

The lower spindle 65 is composed of a lower spindle body 65d consisting of an outer cylinder 65b and an inner cylinder 65c; and a detachment prevention claw 73 fitted in the inner cylinder 65c. The inner cylinder 65c is fitted in a lower shaft 74a formed on the spindle base 74 and is fixed by engaging an engagement piece 65e at its lower end with the spindle base 74.

The outer cylinder 65b has at its lower end a flange 65f the bottom surface of which has a ring-like gear 65g. The gear 65g engages an intermediate gear 75 to rotate the outer cylinder 65b.

A male thread 65h is formed on the outer circumference of the outer cylinder 65b in such a way a threaded portion 76 that moves the spacer 71 in the vertical direction is screwed on the male thread 65h. The threaded portion 76 has a rotation stopper 77 that prevents itself from being rotated when the outer cylinder 65b is rotated. The rotation stopper 77 has one end journaled to the threaded portion 76 and the other end journaled to the mechanical base 62.

A detachment prevention claw 73 is composed of three claw portions 73b that are open outward; three downward-pressing pieces 73a formed between the claw portions; and a lower stopper 73d protruding downward.

Figure 27:
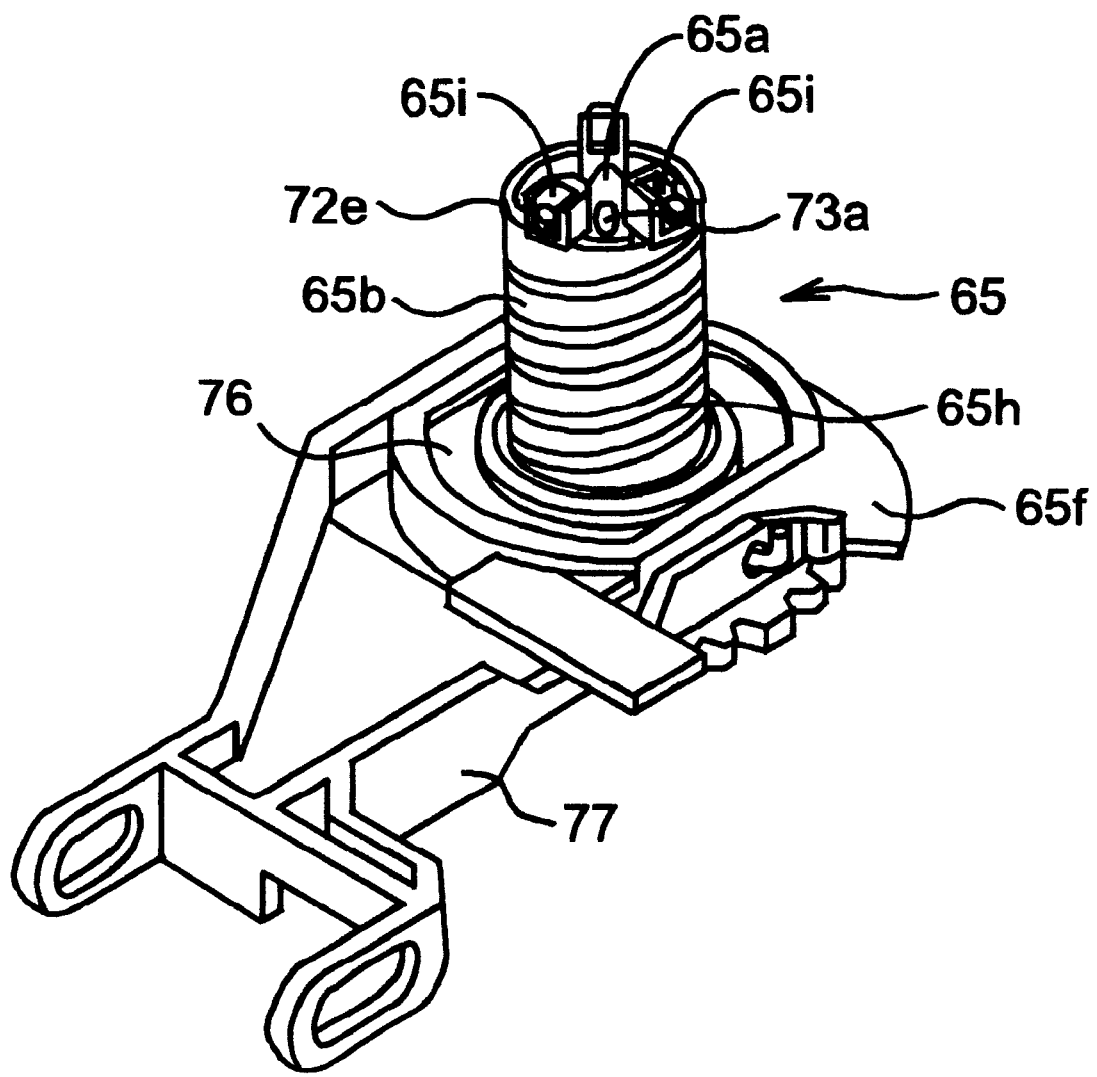
FIG. 27 is a perspective view of the lower spindle of the disc changer according to the second embodiment of this invention.

Three claw holes 65i through which the tips of the claw portions 73b move in and out are formed in the upper part of the inner cylinder 65c (see FIG. 27). Small holes are formed between the claw holes 65i so that the tips of the downward-pressing pieces 73a can protrude therefrom. The detachment prevention claw 73 is pressed upward by a compression spring 78 in the lower shaft 74a to allow the tip 73e of the claw portion 73b to protrude from the claw hole 65i while allowing the downward-pressing piece 73a to protrude from the small hole.

In addition, a protruding portion 65a that presses the holding claw 70 upward is formed at the center of the top of the inner cylinder 65c. The lower side of the protruding portion 65a is tilted so that the claw portion 73b can move in and out through the claw hole 65i.

The operation of the disc changer configured as described above according to the second embodiment of this invention is described below.

When a disc 79 is placed on the subtray and the open close knob is pressed, the main tray 60 is moved to the inside of the apparatus. Once the disc 79 has moved to the sound recording/reproduction position, the sound recording/reproduction device is elevated to clamp the disc 79 in order to start sound recording/reproduction on said disc. After sound recording/reproduction, when any No. key is pressed, the disc 79 is housed at a specified position on the spindle 63.

To sound record or reproduce the disc 79 housed on the spindle 63, the No. key is pressed to remove the specified disc 79 from the spindle 63 to allow the sound recording/reproduction device 61 to execute sound recording/reproduction.

To remove the disc 79 from the spindle 63, the subtray is moved to the position of the spindle 63 to carry the specified disc 79 thereon while the sound recording/reproduction device 61 is stopped.

The operation of the spindle according to the second embodiment is described with reference to FIGS. 25 and 26.

Figure 25:
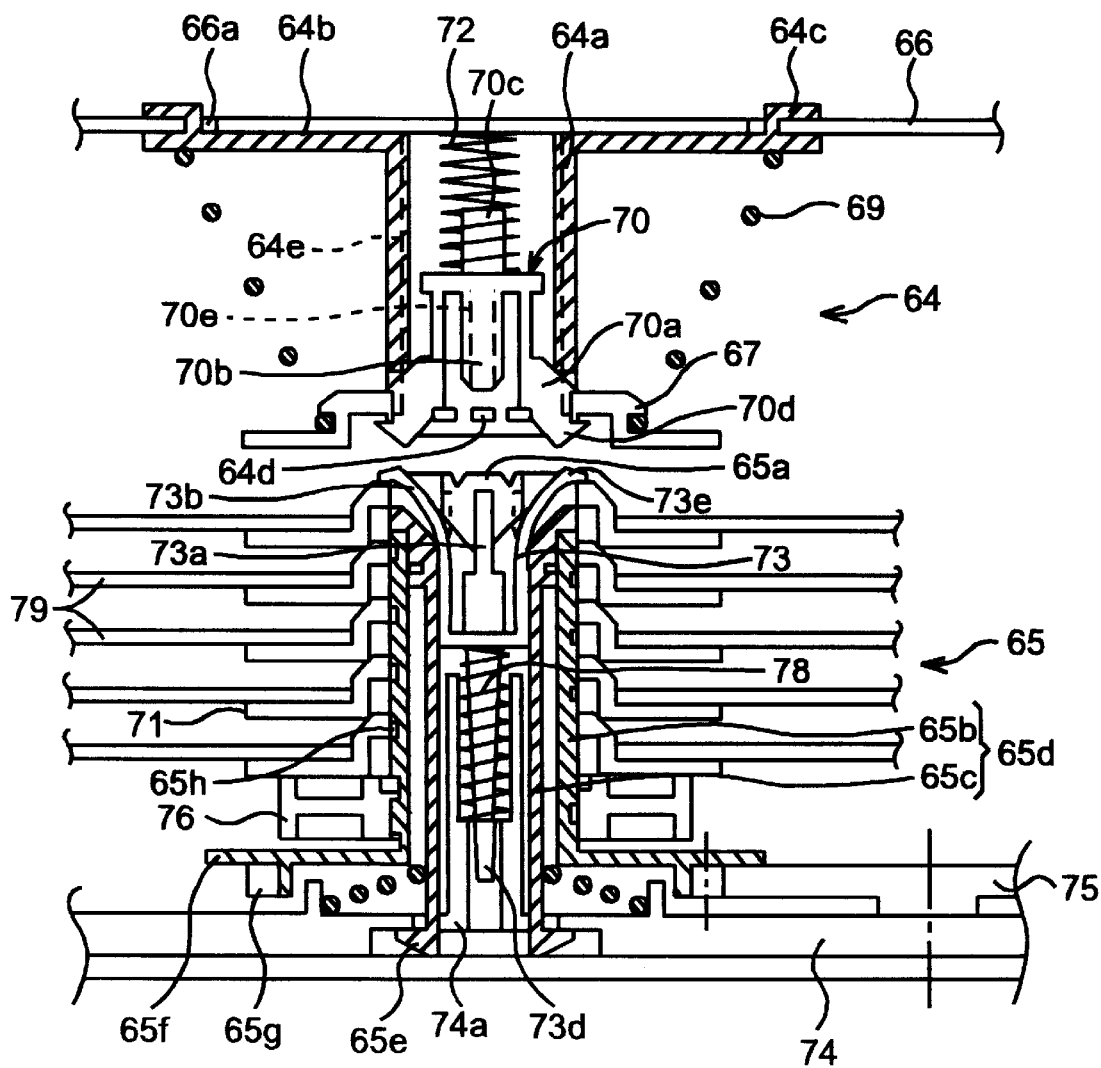
FIG. 25 is a partial cross sectional view of the disc changer according to the second embodiment of this invention in which a lower spindle has been lowered.
Figure 26:
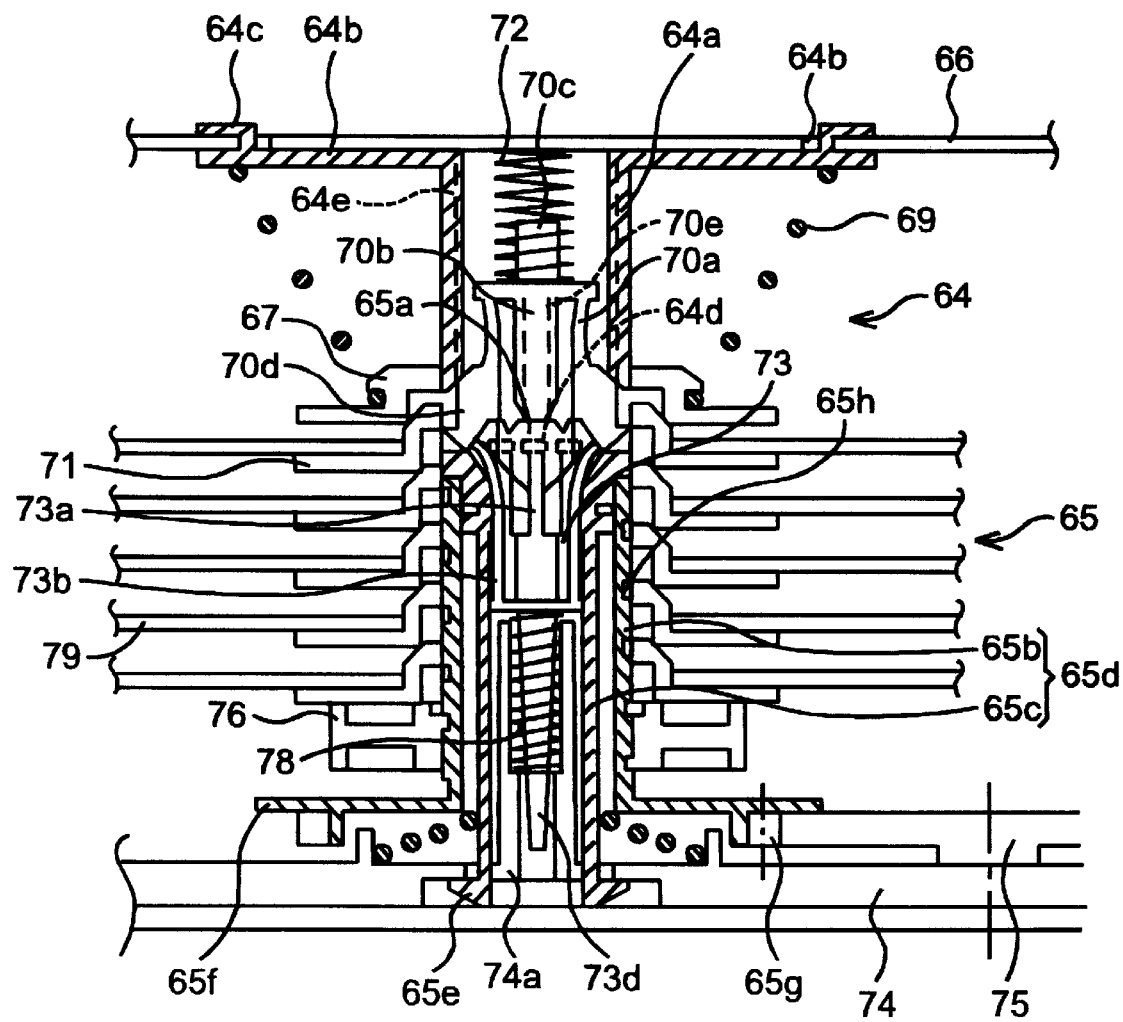
FIG. 26 is a partial cross sectional view of the disc changer according to the second embodiment of this invention in which a lower spindle has been elevated.

FIG. 25 shows a condition in which 5 discs are housed on the lower spindle and in which the upper and lower spindles 64 and 65 are spaced from each other. When an elevating cam (not shown) elevates the spindle base 74, the lower spindle 65 mounted on the spindle base 74 is also elevated. The elevation of the lower spindle 65 causes the three holding claws 70 located at 120° to be fitted to the detachment prevention claw 73, thereby contacting the protruding portion 65a with the core portion 70b of the holding claw 70. As the protruding portion 65a further presses the holding claw 70 upward against the force of the claw-opening spring 72, the tip 70d of the holding claw enters the upper spindle body 64a. Thus, the spacer 71 can be moved toward the upper spindle 64 without being obstructed by the tip of the claw portion 70a of the spacer 71.

At the same time, the downward-pressing piece 73a of the detachment prevention claw 73 contacts the pressing section 64d of the upper spindle 64. When the pressing section 64d presses the detachment prevention claw 73 back downward against the force of the compression spring 78, the tip 73e of the claw portion 73b of the detachment prevention claw 73 retreats into the inner cylinder 65c. Thus, the spacer 71 can be moved from the lower spindle 65 toward the upper spindle 64.

In this state, the rotational force of a motor (not shown) is transmitted to the intermediate gear 75 and the ring-like gear 65g to rotate the outer cylinder 65b. This rotation causes the threaded portion 76 to rise spindle 65, thereby the spacer 71 being pushed up. The threaded portion 76 moves the disc 79 from the lower spindle 65 to the upper spindle 64 and stops when the required disc 79 is located at the lower end of the upper spindle 64.

To move the disc from the upper spindle 64 to the lower spindle 65, the outer cylinder 65b to lower the threaded portion 76.

Once the elevating cam has lowered the spindle base 74 in order to space the upper and lower spindles 64 and 65 from each other, the subtray is moved to between the upper and lower spindles.

When the upper and lower spindles 64 and 65 are spaced from each other, the claw-opening spring 72 presses the holding claw 70 open downward to cause the tip 70d of the claw portion to protrude from the outer circumferential wall of the upper spindle 64 to hold the spacer 71 and disc 79, which have been moved to the upper spindle 64. At the same time, the detachment prevention claw 73 is pressed upward by the compression spring 78 to cause the claw portion 73b to protrude from the claw hole 65i, thereby preventing the spacer 71 fitted on the lower spindle 65 from being detached therefrom.

After the subtray has been moved to between the upper and lower spindles, the elevating cam again elevates the lower spindle 65. After the lower spindle has contacted the upper spindle to disengage the holding claw 70 and when the upper and lower spindles 64 and 65 are again spaced from each other, the required disc 79 is placed on the subtray and transferred to the sound recording/reproduction position or the exterior.

According to this invention, a disc changer in which a plurality of discs are loaded and which selects any of the plurality of discs for sound recording/reproduction, comprises a disc holding means for detachably holding a plurality of spacers on a pair of spindles using a holding claw; a vertical drive means for driving the spacers in the vertical direction to select any position of the plurality of discs held by the plurality of spacers; a spindle drive means for driving the holding claw to engage and disengage the plurality of spacers with and from an upper spindle; a horizontal transfer means for transferring the disc supported on a subtray from any spacer held by the holding claw; a disc clamp means for clamping the disc at a sound recording/reproduction position; a transfer switching means operative during the sound recording/reproduction of the disc for switching the presence of the transfer of the disc to distinguish between the change of another disc and the change and removal of the disc being sound recorded or reproduced; a disc pitch reduction means for reducing the height of the spacers supported by both spindles; and an elevation return means for positively preventing the disc from slipping out from the spacer on both spindles due to external vibration generated when the disc changer body is moved; a disc presser means for preventing the slip-out of the disc from the spacer occurring when the disc changer performs an operation on both spindles and a spacer detachment prevention means for preventing the spacer from being detached from the lower spindle when the lower spindle is elevated or lowered. In addition, slipping out disk from the spacer and the spacer from the lower spindle is prevented. This configuration enables the positions of the plurality of spacers and discs loaded on both spindles to be driven in the vertical direction in order to select any disc for sound recording/reproduction, thereby providing a light, inexpensive, and high-quality disc changer.

What is claimed is:

1. A disc changer in which a plurality of discs are loaded and that selects any one of the plurality of discs for sound recording/reproduction, said disc changer comprising a disc holding means for detachably holding a plurality of spacers on a pair of upper and lower spindles using a holding claw; a vertical drive means for driving said plurality of spacers in a vertical direction to select arbitrary positions for the plurality of discs held by said plurality of spacers; a spindle drive means for driving said holding claw to engage and disengage the plurality of spacers with and from the upper spindle; a horizontal transfer means for transferring one of the plurality of discs supported on a subtray; a disc clamp means for clamping one of the plurality of discs at a sound recording/reproduction position; a disc presser means for preventing the slip-out of one of the plurality of discs from one of the plurality of spacers occurring when the disc changer performs an operation on both upper and lower spindles; and a spacer detachment prevention means for preventing one of the plurality of spacers from being detached from the lower spindle when the lower spindle is elevated or lowered.

2. A disc changer according to claim 1 wherein the holding claw provided on the upper spindle of said disc holding means is manufactured by integrating a core portion that is pressed upward by the lower spindle with a claw portion that holds said one of the plurality of spacers on the upper spindle.

3. A disc changer according to claim 1 wherein the disc presser means has an upper elevating table that can be expanded and contracted for a specified amount above a lower elevating table formed in said vertical drive means, and wherein a disc presser spring provided on a bottom surface of the upper elevating table presses one of the plurality of spacers and one of the plurality of discs installed on both spindles to prevent one of the plurality of discs from slipping out from said one of the plurality of spacers.

4. A disc changer according to claim 1 wherein said disc presser means uses a disc presser spring disposed between a spindle mounting plate and a disc presser in order to press one of the plurality of spacers and one of the plurality of discs installed on both upper and lower spindles, thereby preventing one of the plurality of discs from slipping out from said one of the plurality of spacers.

5. A disc changer according to claim 1 wherein said spacer detachment prevention means includes a detachment prevention claw that can vertically slide for a specified amount on a lower central shaft provided in the lower spindle in said spindle drive means, the detachment prevention claw being constantly pressed upward by a compression spring to protrude from an outer circumference of the lower spindle in order to prevent one of the plurality of spacers from slipping out from the lower spindle, and wherein, when the lower central shaft is pressed upward, an upper end of the detachment prevention claw is pressed downward by a lower end of the upper spindle to cause a claw portion to be constantly retracted into the lower spindle, a housing of the detachment prevention claw in the lower spindle allowing said spacer to smoothly pass between the lower and upper spindles so that arbitrary positions can be selected for the plurality of discs held by the plurality of spacers using said vertical drive means.

6. A disc changer according to claim 1 wherein said spacer detachment prevention means includes a detachment prevention claw that can vertically slide for a specified amount inside the lower spindle in the spindle drive means, the detachment prevention claw being constantly pressed upward by a compression spring to protrude from an outer circumference of the lower spindle in order to prevent one of the plurality of spacers from slipping out from the lower spindle, and wherein when the lower spindle is pressed upward, a downward-pressed piece in said detachment prevention claw is pressed downward by a lower end of said upper spindle to cause a claw portion to be constantly retracted into the lower spindle, a housing of the detachment prevention claw in the lower spindle allowing said one of the plurality of spacers to smoothly pass between the lower and upper spindles so that arbitrary positions can be selected for the plurality of discs held by the plurality of spacers using said vertical drive means.

7. A disc changer according to claim 6 wherein the detachment prevention claw is elastic and wherein a plurality of claw portions that enter and exit the lower spindle and the downward-pressed piece that presses the plurality of claw portions downward are integrated together in a lower part of the detachment prevention claw.

8. A disc changer according to claim 1 wherein the sound recording/reproduction position lies in front of a mechanical base, whereas a disc housing position that is centered at a spindle lies in the rear of the mechanical base.

9. A disc changer in which a plurality of discs are loaded and that selects any one of the plurality of discs for sound recording/reproduction, said disc changer comprising a disc holding means for detachably holding a plurality of spacers on a pair of upper and lower spindles using a holding claw; a vertical drive means for driving said plurality of spacers in a vertical direction to select arbitrary positions for the plurality of discs held by said plurality of spacers; a spindle drive means for driving said holding claw to engage and disengage the plurality of spacers with and from the upper spindle; a horizontal transfer means for transferring one of the plurality of discs supported on a subtray; a disc clamp means for clamping one of the plurality of discs at a sound recording/reproduction position; a transfer switching means operative during the sound recording/reproduction of said one of the plurality of discs for detecting the presence of transfer of the disc to distinguish between a change of another disc and a removal and change of said one of the plurality of discs being sound recorded or reproduced, a disc pitch reduction means for reducing a height of the spacers supported by both upper and lower spindles; an elevation return means for positively preventing one of the plurality of discs from slipping out from the spacer on both upper and lower spindles due to external vibration generated when the disc changer body is moved; a disc presser means for preventing slip-out of one of the plurality of discs from the spacer occurring when the disc changer performs an operation on both upper and lower spindles; and a spacer detachment prevention means for preventing the spacer from being detached from the lower spindle when the lower spindle is elevated or lowered.

10. A disc changer according to claim 9 wherein once the disc changer has finished performing an operation on both upper and lower spindles, said elevation return means rotates the lower spindle to elevate a lower elevating table, moving the spacer and one of the plurality of discs from the lower spindle onto the upper spindle so that they are sandwiched between an upper elevating table and the upper spindle.

* * * * *